(12) United States Patent
Ohki et al.

(10) Patent No.: US 11,231,546 B2
(45) Date of Patent: Jan. 25, 2022

(54) LIQUID CRYSTAL DISPLAY DEVICE AND BRACKET

(71) Applicant: TIANMA JAPAN, LTD., Kanagawa (JP)

(72) Inventors: Toru Ohki, Kawasaki (JP); Hideki Nishimura, Kawasaki (JP)

(73) Assignee: TIANMA JAPAN, LTD., Kanagawa (JP)

(*) Notice: Subject to any disclaimer, the term of this patent is extended or adjusted under 35 U.S.C. 154(b) by 0 days.

(21) Appl. No.: 16/180,624

(22) Filed: Nov. 5, 2018

(65) Prior Publication Data

US 2019/0137682 A1 May 9, 2019

(30) Foreign Application Priority Data

Nov. 6, 2017 (JP) .............................. JP2017-214037
Jul. 5, 2018 (JP) .............................. JP2018-128234

(51) Int. Cl.
*F21V 8/00* (2006.01)
*G02F 1/1333* (2006.01)
*G02F 1/13357* (2006.01)

(52) U.S. Cl.
CPC ..... *G02B 6/0088* (2013.01); *G02F 1/133308* (2013.01); *G02F 1/133317* (2021.01); *G02F 1/133328* (2021.01); *G02F 1/133608* (2013.01); *G02B 6/0011* (2013.01); *G02B 6/0051* (2013.01); *G02F 1/13332* (2021.01); *G02F 1/133314* (2021.01); *G02F 1/133331* (2021.01); *G02F 2201/46* (2013.01);

(58) Field of Classification Search
CPC combination set(s) only.
See application file for complete search history.

(56) References Cited

U.S. PATENT DOCUMENTS

| | | | |
|---|---|---|---|
| 2013/0107143 A1* | 5/2013 | Dighde | G02F 1/133308 349/1 |
| 2014/0232969 A1 | 8/2014 | Tsubaki et al. | |
| 2016/0291391 A1 | 10/2016 | Yoshida | |
| 2016/0370641 A1* | 12/2016 | Hirasawa | G02F 1/133308 |

FOREIGN PATENT DOCUMENTS

| | | |
|---|---|---|
| JP | 2014-160218 A | 9/2014 |
| JP | 2016-194670 A | 11/2016 |

* cited by examiner

*Primary Examiner* — Lauren Nguyen
(74) *Attorney, Agent, or Firm* — Sughrue Mion, PLLC

(57) ABSTRACT

A liquid crystal display device includes a bracket that is fixed to a side face of a backlight unit and bonded to the rear main surface of a front surface panel by an adhesive portion. The bracket includes: a side wall that is fixed to a the side face of the backlight unit, rises from rear to front along the side face, and extends along a side face of the front surface panel; and a beam portion in front of the side wall. The beam portion has at least a portion that is continuous with the side wall, protrudes to outside the side wall along the rear main surface of the front surface panel, extends along the side face of the front surface panel, and is bonded to the rear main surface of the front surface panel by the adhesive portion.

3 Claims, 14 Drawing Sheets

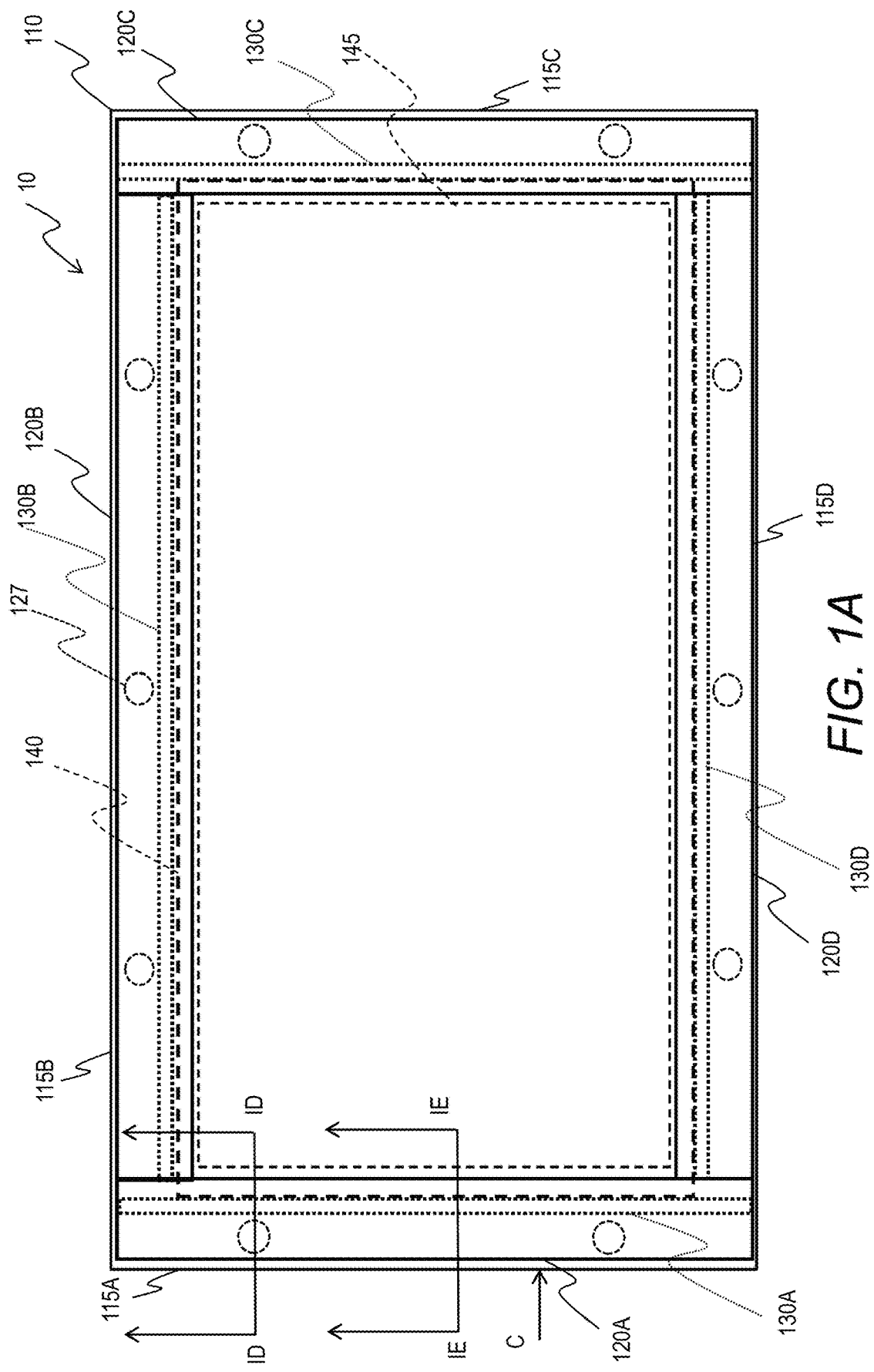

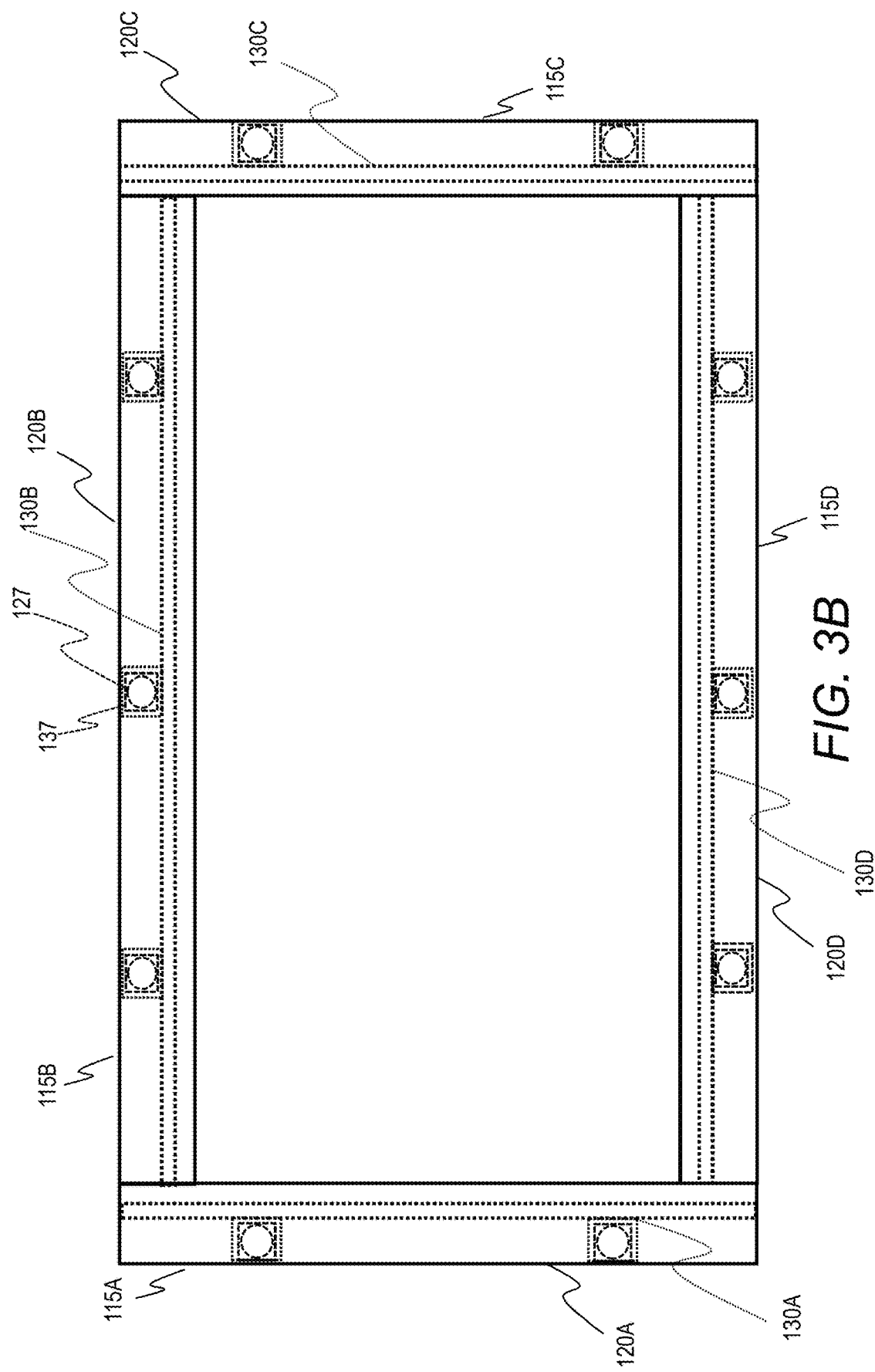

LIQUID CRYSTAL DISPLAY DEVICE AND BRACKET

CROSS-REFERENCE TO RELATED APPLICATIONS

This Non-provisional application claims priority under 35 U.S.C. § 119(a) on Patent Application No. 2017-214037 filed in Japan on Nov. 6, 2017 and Patent Application No. 2018-128234 filed in Japan on Jul. 5, 2018, the entire contents of which are hereby incorporated by reference.

BACKGROUND

The present disclosure relates to a liquid crystal display device.

Regarding liquid crystal display devices, one known structure is one in which a front surface panel such as a decorative cover glass or a touch panel is bonded by an optical elasticity resin layer such as an optical clear resin (OCR) or an optical clear adhesive (OCA).

It is possible to improve image quality by bonding the front surface panel directly to the liquid crystal panel by a thin optical elasticity resin layer. In such a case, a control substrate of the liquid crystal display device is fixed to a backlight unit, and the backlight unit is fixed to the front surface panel by an adhesive or double-sided tape.

JP 2016-194670 A, for example, discloses a structure in which the liquid crystal panel is bonded to a front surface protective plate and is suspended away from the backlight unit. The document indicates that the image quality of the liquid crystal panel is improved as a result of reductions in flatness or deformations in the backlight unit not causing a load or deformation to be transferred to the liquid crystal panel.

Also, JP 2014-160218 A discloses a structure in which a cover glass support case of a backlight unit is used to fix in place the cover glass with a double-sided tape and an adhesive. In order for warpage in the backlight unit not to be transferred to the cover glass, the double-sided adhesive tape is attached to the center of each side while avoiding the four corners of the cover glass.

SUMMARY

The components of the backlight unit undergo thermal expansion as a result of heat generated by the light source, causing deformation. This deformation causes the front surface panel fixed in place by the adhesive or double-sided adhesive tape to also be deformed. In a configuration in which the front surface panel and the liquid crystal panel are bonded to each other by an optical elasticity resin layer, deformation in the front surface panel results in deformation in the liquid crystal panel. Deformation in the liquid crystal panel reduces image quality. In large or high luminance liquid crystal panels, deformation in the backlight unit is greater, and reductions in image quality (uneven luminance for when a uniform luminance image is displayed) are marked.

The structure disclosed in JP 2016-194670 A is fixed to a front surface protective plate at one surface of an external chassis having an L shape in a cross-sectional view. The optical sheets and resin light guide plate that constitute the backlight unit as well as metal plate components and the like undergo thermal expansion due to heat generated by the light source, and thus, deformation of the protective plate and the liquid crystal panel is increased. Also, JP 2014-160218 A does not disclose any measure for avoiding deformation caused by expansion of the backlight unit in a direction parallel to the main surface of the front surface protective plate (liquid crystal panel).

An aspect of the present disclosure is a liquid crystal display device, including: a backlight unit; a liquid crystal panel disposed in front of the backlight unit; a transparent front surface panel that is disposed in front of the liquid crystal panel, and that includes a rear main surface bonded to a front main surface of the liquid crystal panel by a transparent adhesive resin layer; and a bracket that is fixed to a side face of the backlight unit and bonded to the rear main surface of the front surface panel by an adhesive portion. The bracket includes: a side wall that is fixed to the side face of the backlight unit, rises from rear to front along the side face, and extends along a side face of the front surface panel; and a beam portion in front of the side wall. The beam portion has at least a portion that is continuous with the side wall, protrudes to outside the side wall along the rear main surface of the front surface panel, extends along the side face of the front surface panel, and is bonded to the rear main surface of the front surface panel by the adhesive portion.

It is to be understood that both the foregoing general description and the following detailed description are exemplary and explanatory and are not restrictive of this disclosure.

BRIEF DESCRIPTION OF THE DRAWINGS

FIG. 1A depicts a liquid crystal display device as seen from the front.

FIG. 3B depicts elements of a portion extracted from the configuration of FIG. 3A.

DETAILED DESCRIPTION OF THE EMBODIMENTS

Figure 1B:
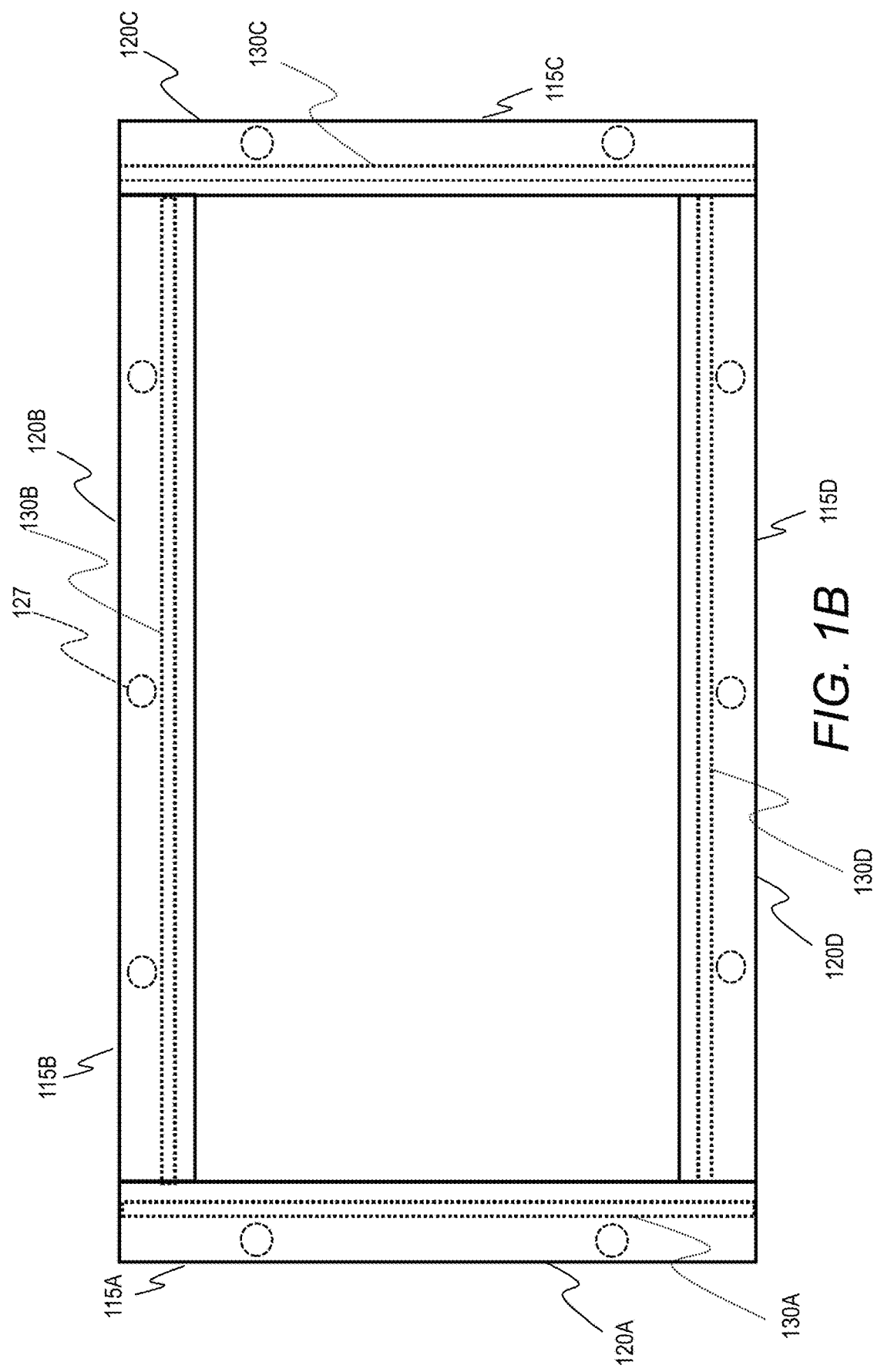
FIG. 1B depicts elements of a portion extracted from the configuration of FIG. 1A.

Hereinafter, embodiments of the present disclosure will be described with reference to the accompanying drawings. The embodiments are merely examples to implement the present disclosure and are not to limit the technical scope of the present disclosure. Elements common to the drawings are denoted by the same reference signs. For clarity of explanation, the sizes and the shapes of the elements may be exaggerated in the drawings.

Embodiment 1

Figure 1C:
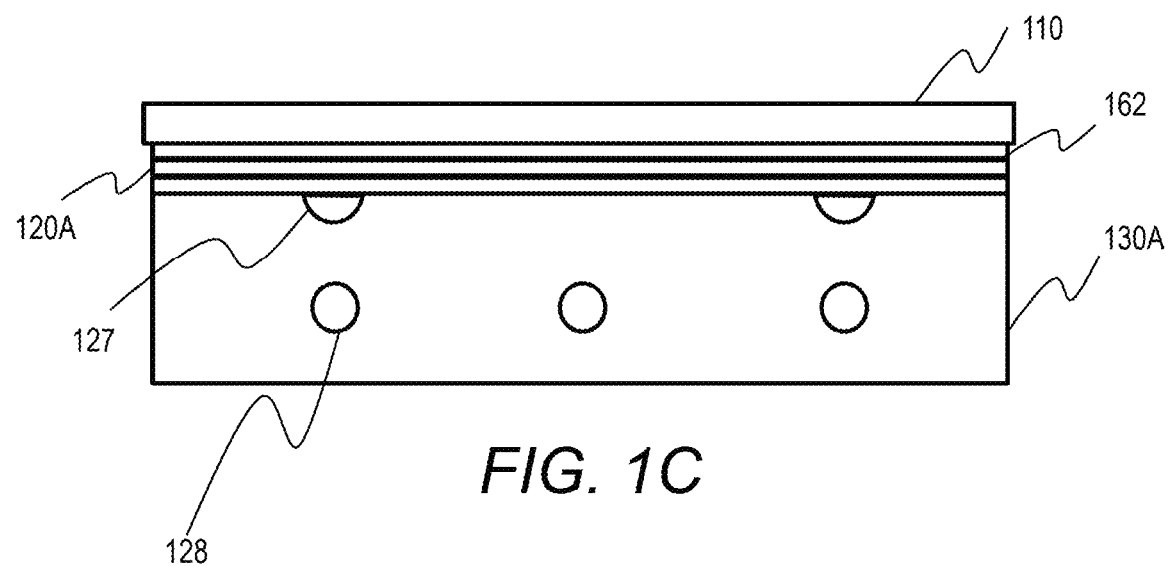
FIG. 1C depicts a side face of the liquid crystal display device indicated by the arrow C in FIG. 1A.
Figure 1D:
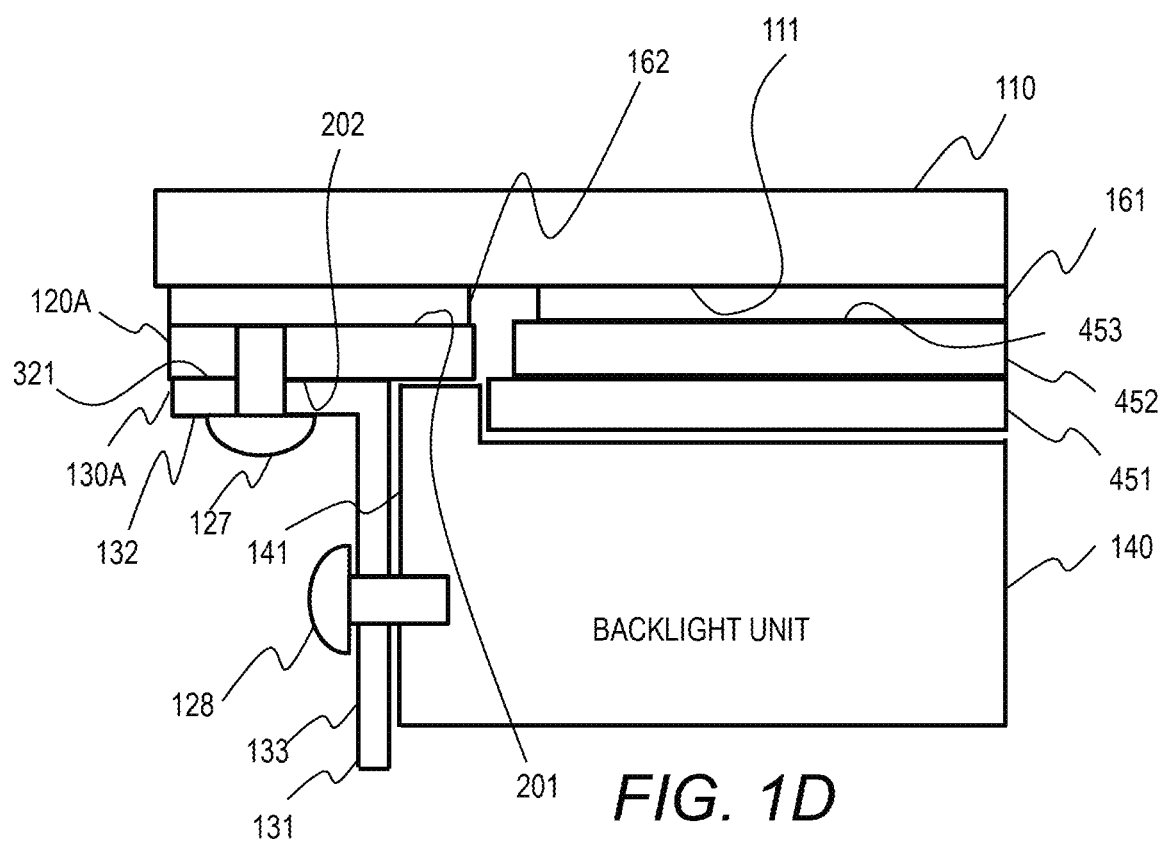
FIG. 1D depicts the cross-sectional structure along the line ID-ID in FIG. 1A.
Figure 1E:
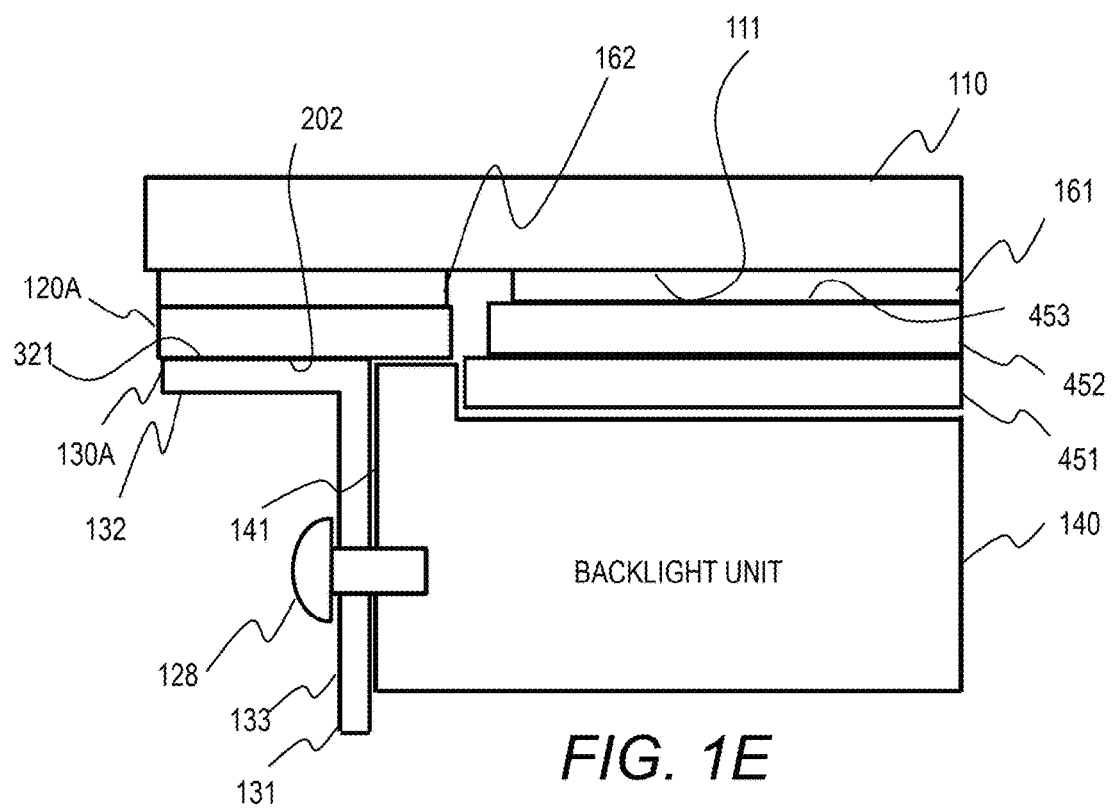
FIG. 1E depicts the cross-sectional structures along the line IE-IE in FIG. 1A.

FIGS. 1A to 1E schematically depict a configuration example of a liquid crystal display device 10 according to Embodiment 1. FIG. 1A depicts a liquid crystal display device 10 as seen from the front, and FIG. 1B depicts elements of a portion extracted from the configuration of FIG. 1A. FIG. 1C depicts a side face of the liquid crystal display device 10 indicated by the arrow C in FIG. 1A. FIGS. 1D and 1E depict, respectively, the cross-sectional structures along the lines ID-ID and IE-IE in FIG. 1A. Below, the side towards the user viewing images displayed in the liquid crystal display device 10 is referred to as the front side, and the side opposite thereto is referred to as the rear side.

FIG. 1A depicts an overall configuration of the liquid crystal display device 10, and FIG. 1B depicts base plates 120A to 120D, side plates 130A to 130D (L-shaped parts or angles), and screws 127 extracted from the liquid crystal display device 10 depicted in FIG. 1A. FIGS. 1A and 1B depict some of the components with solid lines and other components with broken lines.

The liquid crystal display device 10 is provided with a rectangular backlight unit 140, and a rectangular liquid crystal panel unit 145 arranged to the front of the backlight unit 140. A transparent rectangular cover panel 110 is disposed to the front of the liquid crystal panel 145. As will be described later, the rear main surface of the cover panel 110 and the front main surface of the liquid crystal panel 145 are bonded to each other by a transparent adhesive resin layer interposed therebetween.

The cover panel 110 is an example of a front surface panel, and is a front surface plate made of glass or resin, for example. A touch panel may be installed instead of the cover panel 110, for example. The liquid crystal panel 145 and the backlight unit 140 may have a polygonal shape other than a rectangle.

In this example, the cover panel 110 has four sides 115A to 115D (side faces) that define the external shape thereof. The external shape of the cover panel 110 is larger than those of the liquid crystal panel 145 and the backlight unit 140. The cover panel 110 covers the entirety of the liquid crystal panel 145 and the backlight unit 140 as seen from the front. The external shape of the liquid crystal panel 145 is smaller than the external shape of the backlight unit 140. The liquid crystal panel 145 is encompassed by the external shape of the backlight unit 140 as seen from the front.

The liquid crystal display device 10 includes base plates 120A to 120D along each of the sides of the liquid crystal panel 145. The base plates 120A and 120D are plate-shaped components having a rectangular shape as seen from the front. The widest main surfaces face the front-rear direction. The base plates 120A to 120D are disposed to the rear of the cover panel 110, and the cover panel 110 covers the entirety of the base plates 120A to 120D as seen from the front. The sides of the respective base plates 120A to 120D are positioned to the inside of the sides of the cover panel 110 as seen from the front.

The base plates 120A to 120D are disposed along the sides of the main surface of the cover panel 110. That is, the base plates 120A to 120D are disposed so as to overlap the edge regions of the main surface of the cover panel 110. In this example, the base plates 120A and 120C opposing each other in a direction along the main surface of the cover panel 110 have the same shape. Additionally, the base plates 120B and 120D opposing each other in a direction along the main surface of the cover panel 110 have the same shape.

The base plates 120A and 120C respectively extend along the left side and right side in FIG. 1A of the cover panel 110. The base plates 120B and 120D respectively extend along the upper side and lower side in FIG. 1A of the cover panel 110. The base plates 120B and 120D are sandwiched between the base plates 120A and 120C in a direction along the main surface of the cover panel 110.

The base plates 120A to 120D are disposed so as to surround from the outside the outer circumference of the liquid crystal panel 145. As seen from the front, the base plates 120A to 120D cover sides forming the outer shape of the backlight unit 140.

Side plates 130A to 130D are disposed to the rear sides of the base plates 120A to 120D, respectively. FIGS. 1A and 1B depict only a portion of the side plates 130A to 130D with broken lines. Specifically, side walls 131 (described later) of the side plates 130A to 130D are depicted.

The side plates 130A and 130C are fixed, respectively, to the base plates 120A and 120C using two screws 127. The side plates 130B and 130D are fixed, respectively, to the base plates 120B and 120D using three screws 127. FIG. 1A indicates only one screw with the reference character 127. In this manner, the base plates 120A to 120D are fixed to the side plates 130A to 130D in regions arranged apart from each other along the side faces (sides) of the cover panels 110.

FIG. 1C depicts a side face of the liquid crystal display device 10 where the side plate 130A and the base plate 120A are disposed. Other side faces have a similar structure. The base plate 120A is disposed to the front of the side plate 130A. The side plate 130A is fixed to the side of the (case of the) backlight unit 140 by screws 128. In the example depicted in FIG. 1C, the three screws 128 arranged along the side face (side) of the cover panel 110 fix the side plate 130A to the side face of the backlight unit 140.

A bonding layer 162 (bonding portion) is present between the base plate 120A and the cover panel 110, and the bonding layer 162 (bonding portion) bonds the front side face of the base plate 120A to the rear side face of the cover panel 110. The bonding layer 162 can be a double-sided adhesive tape or can be made of a silicone resin or acrylic resin that is cured by UV light, heat, moisture, and the like.

FIG. 1D depicts the cross-sectional structure along the line ID-ID in FIG. 1A. Specifically, FIG. 1D depicts the cross-sectional structure of the portion where the side plate 130A and the base plate 120A are fixed to each other by the screw 127. FIG. 1E depicts the cross-sectional structure along the line IE-IE in FIG. 1A. Specifically, FIG. 1E depicts the cross-sectional structure of the portion where the side plate 130A and the base plate 120A are not fixed to each other by the screw 127. The cross-sectional structures of other side faces of the liquid crystal display device 10 are similar to the structures of FIGS. 1D and 1E.

A TFT (thin film transistor) substrate 451, a CF (color filter) substrate 452, an adhesive resin layer 161, and a cover panel 110 are layered in the stated order from the rear. The TFT substrate 451 and the CF substrate 452 constitute the liquid crystal panel 145. The TFT substrate 451 and the CF substrate 452 are disposed to the front of the backlight unit 140.

The transparent adhesive resin layer 161 is present between the rear main surface 111 of the cover panel 110 and the front side face 453 of the CF substrate 452. The adhesive resin layer 161 is bonded to the rear main surface 111 of the cover panel 110 and the front side face 453 of the CF substrate 452, and bonds together the cover panel 110 and the CF substrate 452. The adhesive resin layer 161 is bonded to the front surface of the display region of the liquid crystal panel 145 (CF substrate 452), for example.

The adhesive resin layer 161 is made of an optical clear resin (OCR) that is a liquid resin cured by UV light, heat, moisture, or the like, for example. The adhesive resin layer 161 may alternatively be made of an optical clear adhesive (OCA).

The TFT substrate 451 and the CF substrate 452 are layered and bonded by a sealing member (adhesive) that is not depicted. The CF substrate 452 is a substrate opposing the TFT substrate 451. A liquid crystal material is sealed between the TFT substrate 451 and the CF substrate 452. The CF substrate 452 is a substrate disposed to the front of the TFT substrate 451.

In this example, the TFT substrate 451 and the CF substrate 452 are rectangular. The substrates may alternatively have another outer shape. The TFT substrate 451 and the CF substrate 452 each have a front main surface, a rear main surface, and four side edge faces that surround these main surfaces.

The TFT substrate 451 includes a substrate, a TFT array circuit formed on the front main surface of an insulating substrate, and a polarizing plate fixed to the rear main surface of the insulating substrate. The CF substrate 452 includes color filter layers of a plurality of colors formed on the rear main surface of an insulating substrate, and a polarizing plate fixed to the front main surface of the insulating substrate.

The TFT substrate 451 and the CF substrate 452 are disposed to the front of the backlight unit 140. The liquid crystal panel 145 is separated from the backlight unit 140 and is supported in suspension by the cover panel 110 bonded thereto by the adhesive resin layer 161. The liquid crystal panel 145 is also separated from the base plate 120A and the side plate 130A. The liquid crystal panel 145 may be in contact with the backlight unit 140, for example.

The backlight unit 140 includes, in addition to the light source, a light guide plate, a diffusion plate, a condensing plate, and the like that are layered thereon, for example. These components of the backlight unit 140 are housed in a case. The backlight 140 radiates planar light towards the liquid crystal panel 145.

The TFT substrate 451 controls the transmission amount of light from the backlight unit 140 at each pixel in the display region under the control of a controller (not depicted). The color filter layers for each pixel of the CF substrate 452 selectively allow through light of a specific color among the light from the TFT substrate 451.

The CF substrate 452 may be an opposite substrate that does not have color filter layers. The control mode for the liquid crystals may be any one of the following: twisted nematic (TN), vertical alignment (VA), in-plane switching (iPS), fringe field switching (FFS), or the like.

As depicted in FIGS. 1D and 1E, the side plate 130A is a component with an L-shaped cross-section. The side plate 130A includes the side wall 131 and a front end portion 132 that is continuous with the front side end of the side wall 131. The front end portion 132 protrudes from the front end portion 132 to the outside (left side in FIGS. 1D and 1E). The angle between the side wall 131 and the front end portion 132 is substantially a right angle in this example.

The side plate 130A can be formed by press working one metal plate made of iron, stainless steel, or the like, for example. In such a case, both the side wall 131 and the front end portion 132 are in the form of a plate having the same thickness, are continuous with each other, and are made of the same material.

The inner main surface of the side wall 131 opposes the outer side face 141 of the backlight unit 140, and the side wall 131 is fixed to the side face 141 by the screws 128. The screws 128 are male screws that engage with female screw threads formed in the case of the backlight unit 140. The main surface of the side wall 131 is the surface with the greatest area. The side wall 131 rises to the front from the rear side along the side face 141 of the backlight unit 140.

As depicted in FIGS. 1B and 1C, the side wall 131 extends along the side face 115A of the cover panel 110. In this example, the side face 115A as seen from the front matches with a side of the rear main surface 111.

The front end portion 132 protrudes to the outside of the outer side face 133 (outer main surface) of the side wall 131, along the rear main surface 111 of the cover panel 110. The front end portion 132 extends along the side face 115A of the cover panel 110. The width of the front end portion 132 is narrower than the width of the side wall 131, for example.

The base plate 120A is disposed to the front of the front end portion 132. The front side face 321 (front main surface) of the front end portion 132 opposes the rear side face 202 (rear main surface) of the base plate 120A. The screw 127 penetrates through a penetrating hole formed in the front end portion 132 from the rear side face of the front end portion 132 to the front side face 321. The screws 127 are male screws that engage with female screw threads formed in the base plate 120A.

The base plate 120A is a plate made of a metal such as iron or stainless steel, for example. As will be described later, the flexural rigidity of a portion (beam portion) constituted of the base plate 120A and the front end portion 132 that are screwed together is greater than the flexural rigidity of the side wall 131. As a result, it is possible to release deformation of the cover panel 110 resulting from in-plane deformation of the backlight unit 140.

Regarding the base plate 120A, the thickness, the area of the main surface, and the material can be freely chosen within a range satisfying the above conditions. The thickness of the base plate 120A can be the same as or different from the thickness of the front end portion 132. The base plate 120A, the front end portion 132, and the side wall 131 are made of the same material (stainless steel: SUS304, for example), and have the same thickness.

In this case, the beam portion (portion constituted of base plate 120A and front end portion 132) has a thickness of substantially double the side wall 131 made of the same material. As a result, the flexural rigidity of the beam portion is greater than the flexural rigidity of the side wall 131. The backlight unit 140 expands due to heat when used for a long period of time. Deformation of the cover panel 110 resulting from the backlight unit 140 pressing against the side wall can be released due to the flexural rigidity of the beam portion being greater than that of the side wall.

As another example, the base plate 120A may be made of a galvanized steel plate (Young's modulus of approximately 205×109 N/m2) with a high flexural rigidity, and the front end portion 132 (side wall 131) may be made of stainless steel (Young's modulus of approximately 197×109 N/m2). Where both have the same thickness, the flexural rigidity of the beam portion is markedly greater than the flexural rigidity of the side wall 131. This configuration can further release deformation of the cover panel 110. Also, by reducing the thickness of the base plate 120A while taking into account the Young's modulus, it is possible to release deformation of the cover panel 110 and reduce the weight of the material forming the base plate 120A.

In the example of FIGS. 1D and 1E, the front side face 201 and the rear side face 202 of the base plate 120A have a greater width than the front side face 321 of the front end portion 132. The base plate 120A protrudes further inward (right side in FIGS. 1D and 1E) than the side wall 131 (inner main surface thereof), and overlaps a portion of the backlight unit 140. It is possible to expand the bonding region between the base plate 120A and the cover panel 110 towards the inner side of the backlight unit 140 (towards the liquid crystal panel 145), and reduce the width of the front end portion 132, or in other words reduce the size of the frame region of the liquid crystal display device 10.

The front side face 201 of the base plate 120A opposes the rear main surface 111 of the cover panel 110, and the bonding layer 162 is present therebetween. The bonding layer 162 is bonded to the front side face 201 of the base plate 120A and the rear main surface 111 of the cover panel 110. The continuous bonding region formed by the bonding layer 162 includes a region to the inside of the inner main surface of the side wall 131 and a region to the outside of the outer main surface 133.

In this example, the bonding layer 162 is formed to the outside of the adhesive resin layer 161 and separated therefrom. By forming the bonding layer 161 and the adhesive resin layer 162 separately, it is possible to select an appropriate material and shape according to the required characteristics thereof. The bonding layer 162 may be a portion that is made of the same material as and continuous with the adhesive resin layer 161.

In the example of FIGS. 1D and 1E, the side plate 130, the base plate 120A, and the screws 127 that screw together these plates constitute an example of a bracket that fixes the cover panel 110 to the backlight unit 140. In the above configuration example, the base plate and the side plate are screwed to each other, but the base plate and the side plate may be fixed to each other by an adhesive in a plurality of separated bonding regions. The base plate and the side plate may be fixed to each other by an adhesive in a continuous bonding region.

Figure 2A:
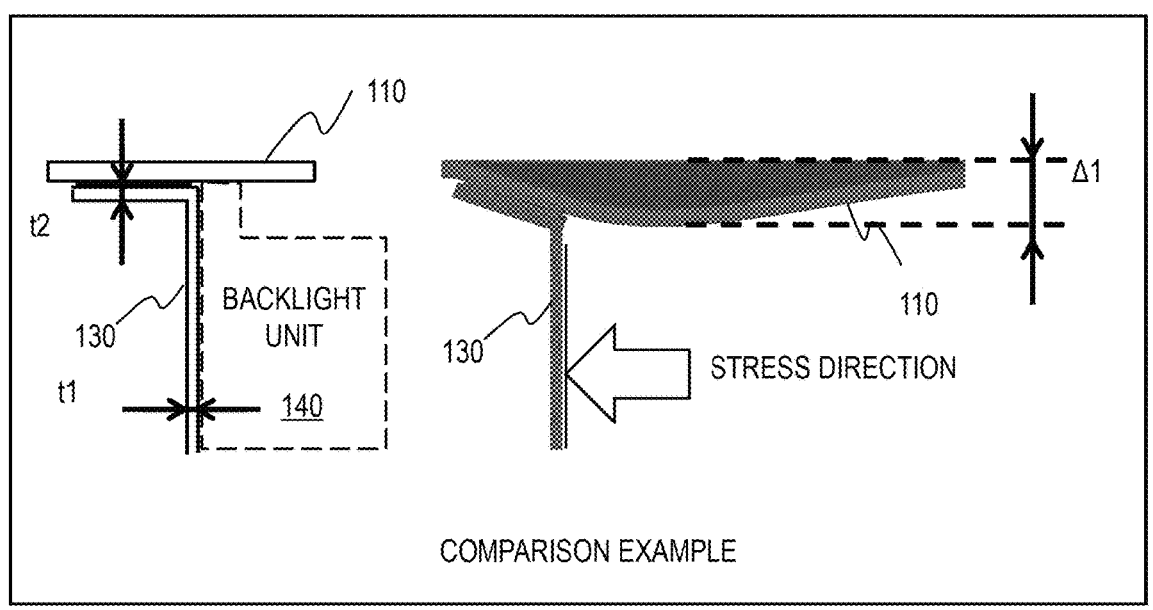
FIG. 2A depicts a first configuration example and a simulation image of a liquid crystal display device according to an embodiment.
Figure 2B:
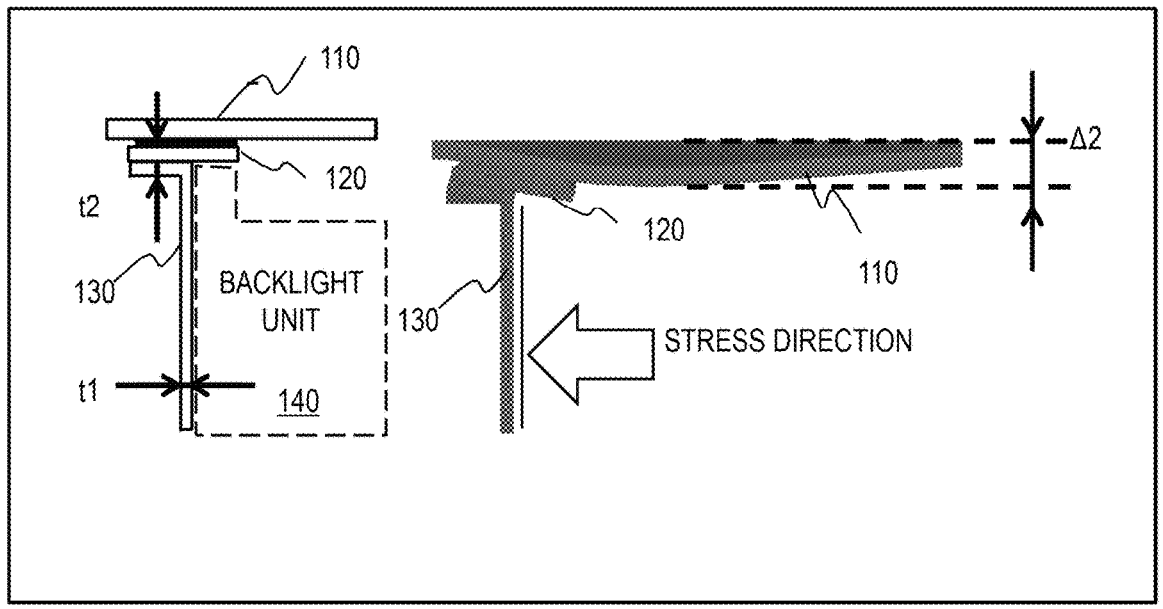
FIG. 2B depicts a second configuration and a simulation image of a liquid crystal display device according to an embodiment.
Figure 2C:
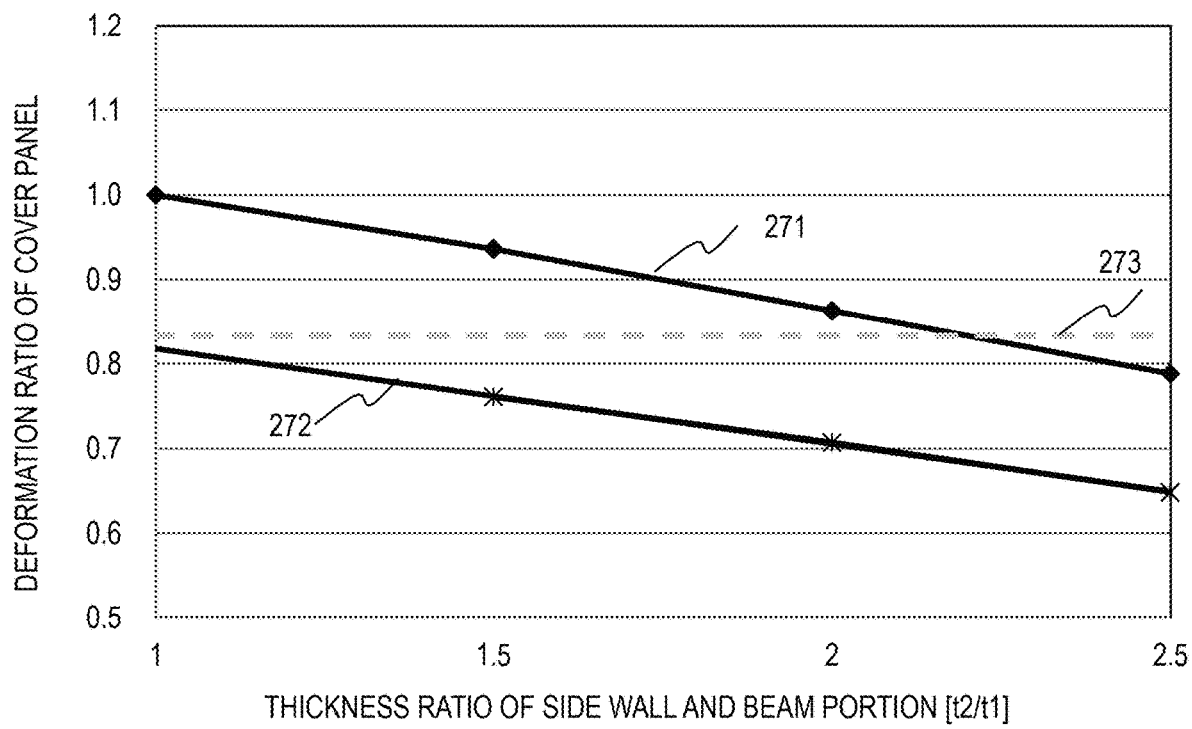
FIG. 2C depicts simulation results of the liquid crystal display devices of the two above-mentioned configurations.

A simulation of the deformation amount of the front surface panel resulting from deformation of the backlight unit in a liquid crystal display device having different configurations will be described with reference to FIGS. 2A, 2B, and 2C. FIG. 2A depicts a first configuration example and a simulation image of a liquid crystal display device according to an embodiment. FIG. 2B depicts a second configuration and a simulation image of a liquid crystal display device according to an embodiment. FIG. 2C depicts simulation results of the liquid crystal display devices of the two above-mentioned configurations.

The first configuration example depicted in FIG. 2A is constituted of a cover panel 110 and a side plate 130 that is bonded to the cover panel 110 and screwed to the backlight unit 140. In other words, the base plate is omitted from the configuration described with reference to FIGS. 1A to 1E. The thickness of the side wall of the side plate 130 is represented by t1 and the thickness of the front end portion (beam portion) is represented by t2. The deformation amount of the cover panel 110 is represented by Δ1. The stress resulting from the deformation of the backlight unit 140 is applied to the outside of the side wall of the side plate 130.

The second configuration example depicted in FIG. 2B is constituted of a cover panel 110, a base plate 120 bonded to the cover panel 110, and a side plate 130 that is screwed to the base plate 120 and the backlight unit 140, according to the configuration described with reference to FIGS. 1A to 1E.

The thickness of the side wall of the side plate 130 is represented by t1. The total thickness of the layered front end portion and base plate 120 (beam portion) is represented by t2. The deformation amount of the cover panel 110 is represented by Δ2. The stress resulting from the deformation of the backlight unit 140 is applied to the outside of the side wall of the side plate 130.

FIG. 2C depicts the simulation results of the configurations depicted in FIGS. 2A and 2B. The vertical axis indicates the ratio of the deformation amounts Δt1 and Δt2 of the cover panel 110 in relation to a reference value. In the first configuration example, the reference value is the deformation amount Δt1 for when the thickness t1 of the side wall is the same as the thickness t2 of the front end portion. The line 271 indicates simulation results of the first configuration example. The line 272 indicates simulation results of the second configuration example. The line 273 indicates an example of a maximum allowable deformation amount of the cover panel 110.

The line 271 indicates the relationship between the deformation amount Δt1 of the first configuration example and the ratio between the thickness t2 of the beam portion and the thickness t1 of the side wall. The deformation amount Δt1 of the cover panel 110 is reduced as the thickness t2 of the beam portion increases in relation to the thickness t1 of the side wall.

The line 272 indicates the relationship between the deformation amount Δt2 of the second configuration example and the ratio between the thickness t2 of the beam portion and the thickness t1 of the side wall. In the simulation, the thickness t2 was changed by keeping the thickness of the front end portion at the same value as the thickness of the side wall and changing the thickness of the base plate 120. The deformation amount Δt2 of the cover panel 110 is reduced as the thickness t2 of the beam portion increases in relation to the thickness t1 of the side wall. Where the ratio of the thickness t1 of the side wall and the thickness t2 of the beam portion is the same, the deformation amount of the second configuration example is less than the deformation amount of the first configuration example.

The deformation amount of the cover panel 110 is reduced as the thickness t2 of the beam portion increases in relation to the thickness t1 of the side wall, as made clear from the simulation results indicated in FIG. 2C. Also, by fixing the base plate 120 to the front end portion of the side plate 130 at a plurality of separated regions, it is possible to further reduce the deformation amount of the cover panel 110.

When the backlight unit 140 deforms due to thermal expansion, external stress in a direction parallel to the main surface of the cover panel 110 is applied to the side plate 130 fixed to the side face 141 of the backlight unit 140.

In the first configuration example, the side plate 130 is bonded directly to the cover panel 110 on a surface parallel to the main surface of the cover panel 110 (front side face 321 of front end portion 132). In the second configuration example, the side plate 130 is fixed in part to the base plate 120 on a surface parallel to the main surface of the cover panel 110 (front side face 321 of front end portion 132). The base plate 120 is bonded to the cover panel 110.

Deformation of the side plate 130 applies a bending moment to the front end portion 132 with the corner between the side wall 131 and the front end portion 132 as the pivot. As a result, deformation occurs in the cover panel 110 and the base plate 120.

However, by increasing the thickness of the front end portion 132 in the first configuration example, it is possible to increase the flexural rigidity of the front end portion 132 (beam portion). Also, by increasing the thickness of the base plate 120 in the second configuration example, it is possible to increase the flexural rigidity of the front end portion 132 and the base plate 120 (beam portion), which are screwed together.

If the flexural rigidity of the beam portion is greater than the flexural rigidity of the side wall 131, then the beam portion is less susceptible to deformation than the side wall 131. The side wall 131, which has a relatively high deformability, greatly deforms, and deformation of the beam portion and the resultant deformation of the cover panel 110 are reduced. As a result, it is possible to suppress a decrease in image quality resulting from deformation of the liquid crystal panel 145 bonded to the cover panel 110 by the adhesive resin layer 161.

Also, according to the simulation results, it is possible to further reduce the deformation amount of the beam portion and the cover panel 110 by partially fixing the base plate 120 to the side plate 130. By changing the difference in thickness between the side plate 130 and the base plate 120 and the materials thereof, it is possible to easily adjust the difference in rigidity between the side wall and the beam portion (difference in durability against deformation).

Embodiment 2

FIGS. 3A to 3E depict a configuration example of a liquid crystal display device 10 according to Embodiment 2. A bracket of this configuration further includes female screw studs that protrude to the rear from a rear side face of a base plate 120. Male screws 127 penetrate the holes of the front end portion 132 of the side plate 130 and engage with the female screw studs. This makes it possible to more securely screw together the base plate 120 and the front end portion 132 of the side plate 130. Differences from Embodiment 1 will be primarily described below.

Figure 3A:
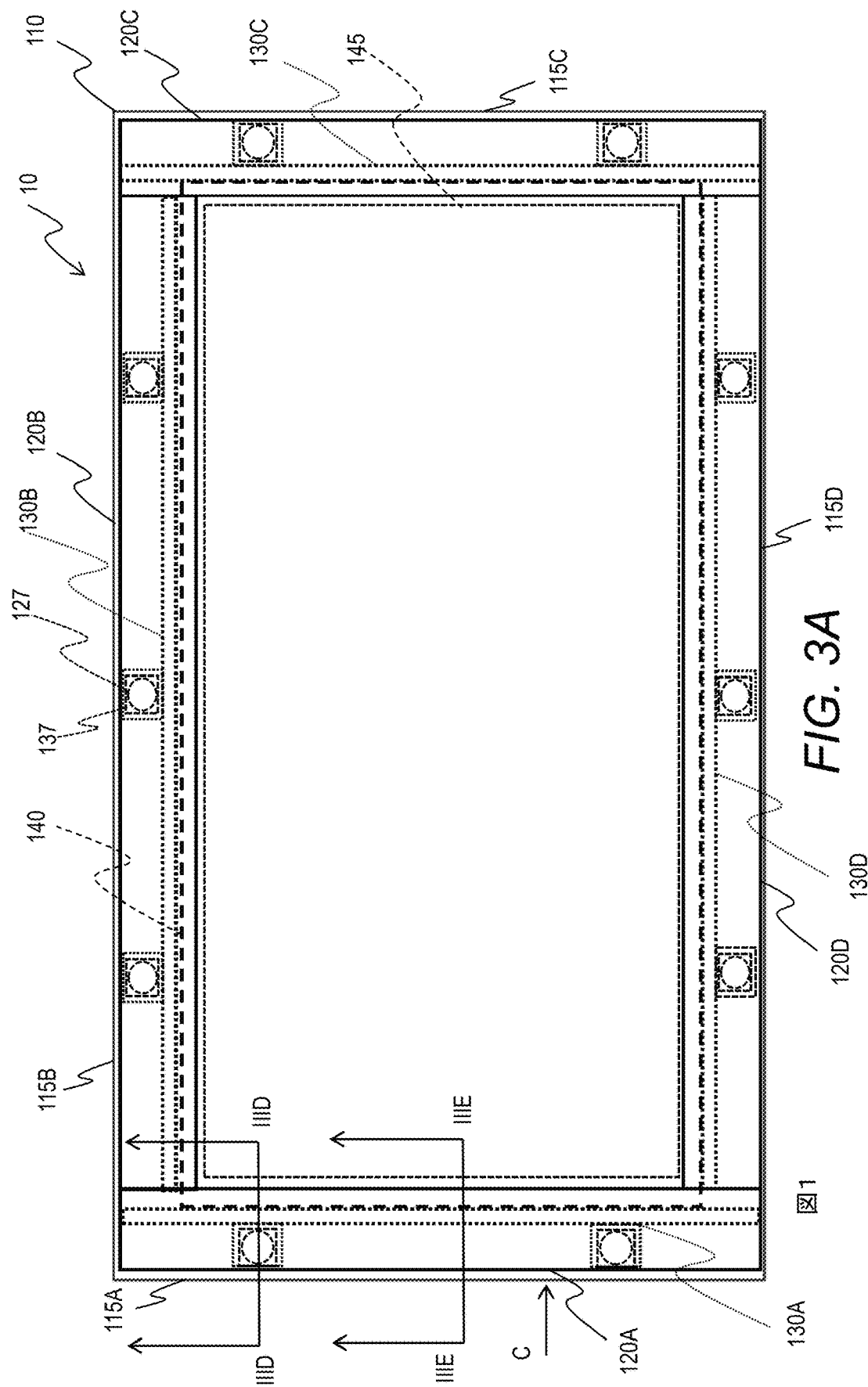
FIG. 3A depicts a liquid crystal display device as seen from the front.
Figure 3C:
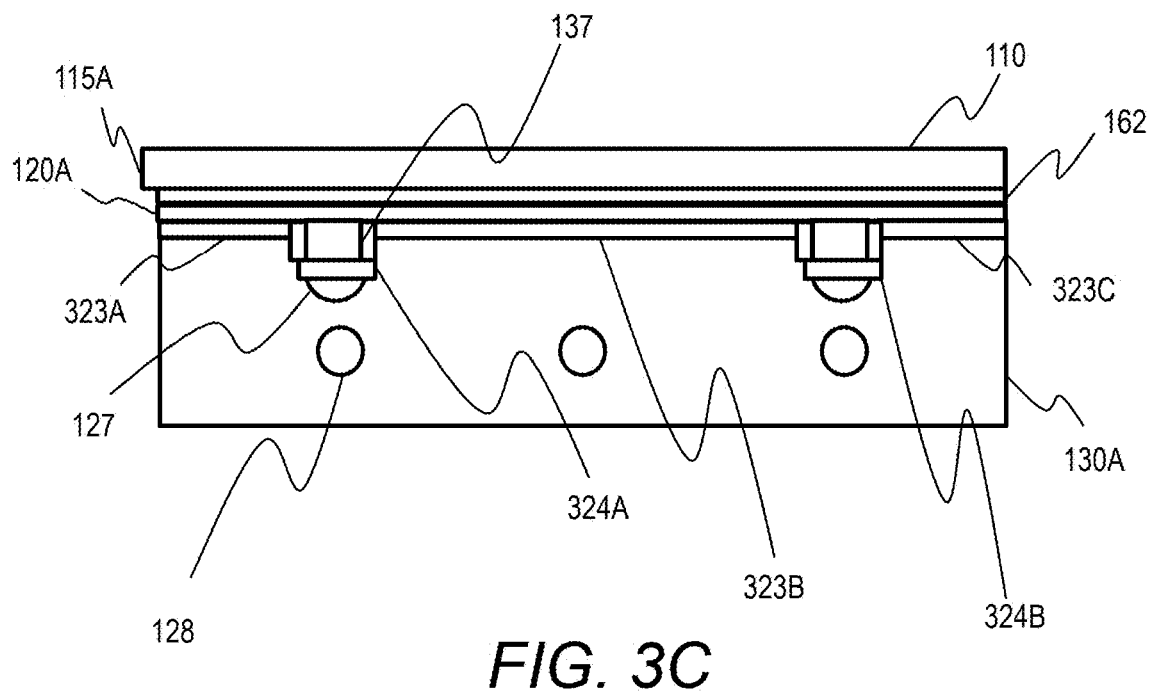
FIG. 3C depicts a side face of the liquid crystal display device indicated by the arrow C in FIG. 3A.
Figure 3D:
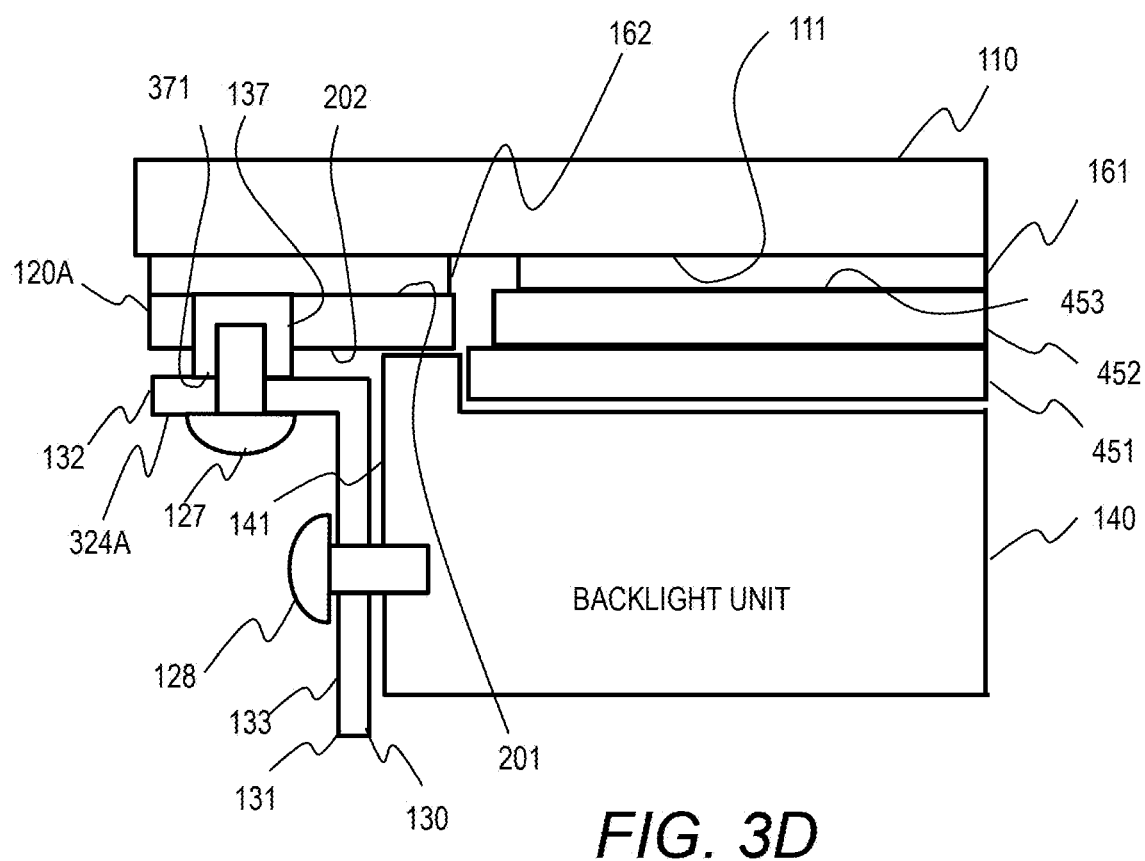
FIG. 3D depicts the cross-sectional structure along the line IIID-IIID in FIG. 3A.
Figure 3E:
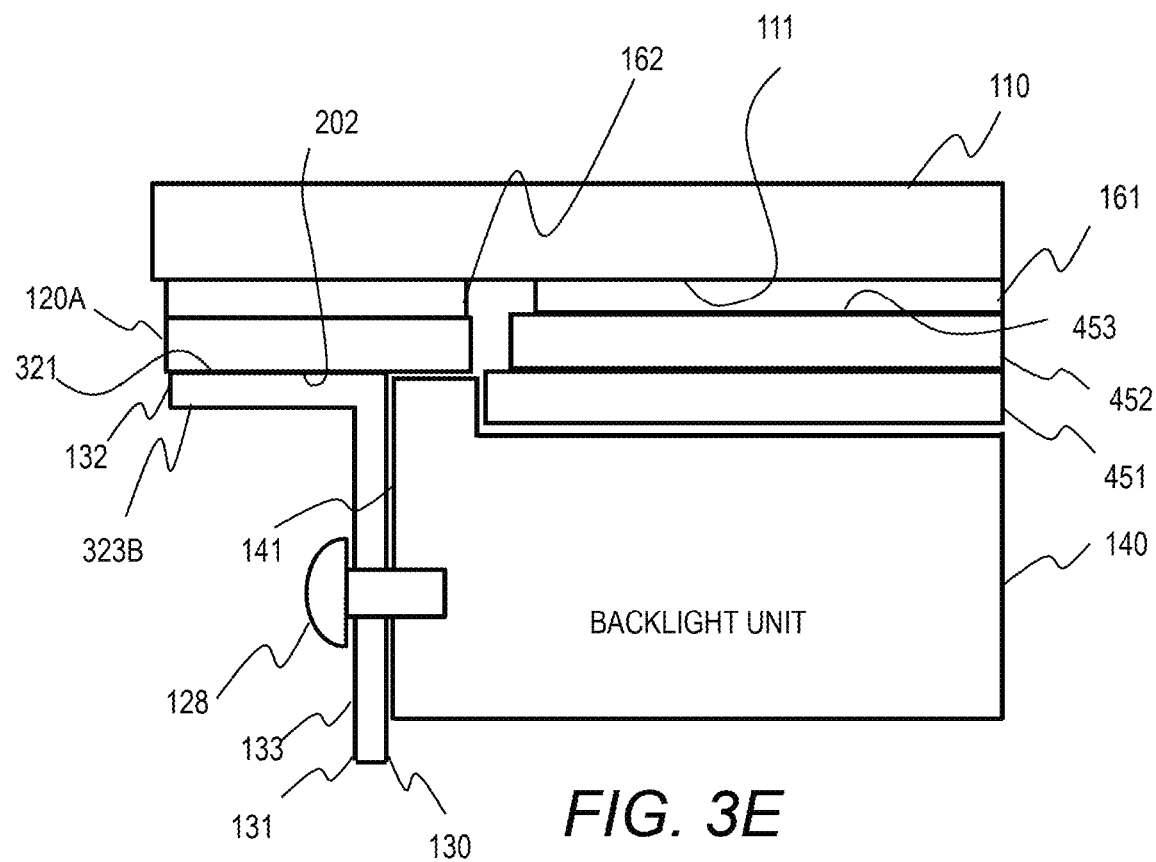
FIG. 3E depicts the cross-sectional structure along the line IIIE-IIIE in FIG. 3A.

FIG. 3A depicts a liquid crystal display device 10 as seen from the front, and FIG. 3B depicts elements of a portion extracted from the configuration of FIG. 3A. FIG. 3C depicts a side face of the liquid crystal display device 10 indicated by the arrow C in FIG. 3A. FIGS. 3D and 3E depict, respectively, the cross-sectional structures along the lines IIID-IIID and IIIE-IIIE in FIG. 3A.

FIG. 3A depicts an overall configuration of the liquid crystal display device 10, and FIG. 3B depicts base plates 120A to 120D, side plates 130A to 130D, male screws 127, and female screw studs 137 extracted from the liquid crystal display device 10 depicted in FIG. 1A. FIGS. 3A and 3B depict some of the components with solid lines and other components with broken lines.

FIG. 3C depicts a side face of the liquid crystal display device 10 where the side plate 130A and the base plate 120A are disposed. Other side faces have a similar structure. The front end portion 132 of the side plate 130A includes a plurality of separated front side portions 323A, 323B, and 323C. The front end portion 132 further includes separated rear side portions 324A and 324B.

The rear side portions 324A and 324B are located to the rear (lower side in FIG. 3C) of the front side portions 323A, 323B, and 323C. Each of the rear side portions is present between the front side portions in a direction along the side face 151A (side of rear main surface 111) of the cover panel 110 (left-right direction in FIG. 3C). Specifically, the rear side portion 324A is present between the front side portions 323A and 323B, and the rear side portion 324B is present between the front side portions 323B and 323C.

The plurality of female screw studs 137 are embedded into and fixed to the base plate 120A. In the example of FIG. 3C, two female screw studs 137 are fixed to the base plate 120A. In FIG. 3C, only one female screw stud is indicated with the reference character 137. The female screw studs 137 are respectively positioned to the front of the rear side portions 324A and 324B. The number of female screw studs 137 and the number of rear side portions 324A and 324B are the same, and the positions thereof, as seen from the front, match.

The male screws 127 respectively penetrate the holes formed in the rear side portions 324A and 324B from the rear to the front, and engage with the female screw studs 137. The base plate 120A and the side plate 130A are fixed to each other by only the male screws 127. The number of fixing positions between the base plate 120A and the side plate 130A (number of male screws 127 or female screw studs 137) is any number of one or greater.

FIG. 3D depicts the cross-sectional structure along the line IIID-IIID in FIG. 3A. Specifically, FIG. 3D depicts the cross-sectional structure of the portion where the side plate 130A and the base plate 120A are fixed to each other by the screw 127. FIG. 3E depicts the cross-sectional structure along the line IIIE-IIIE in FIG. 3A. Specifically, FIG. 3E depicts the cross-sectional structure of the portion where the side plate 130A and the base plate 120A are not fixed by the screw 127. The cross-sectional structures of other side faces of the liquid crystal display device 10 are similar to the structures of FIGS. 3D and 3E.

As depicted in FIG. 3D, the female screw studs 137 are made of a metal such as stainless steel or iron, for example, and are embedded into the base plate 120A. The female screw studs 137 protrude to the rear through the base plate 120A, and a rear side face 371 thereof is to the rear of the rear side face 202 of the base plate 120A. The rear side portion 324A in the front end portion 132 of the side plate 130A is in contact with the rear side face 371 of the female screw stud 137.

The rear side portion 324A is separated from the base plate 120A. The male screw 127 penetrates the hole formed in the rear side portion 324A from the rear to the front, and engages with the female screw stud 137. The male screw 127 and the female screw stud 137 screw together the rear side portion 324A (side plate 130A) and the base plate 120A.

As depicted in FIG. 3E, in the portion not fixed by a screw, the front side portion 323B in the front end portion 132 of the side plate 130A opposes the base plate 120A. The front side portion 323B is in contact with the rear side face 202 of the base plate 120A or there is a clearance between the front side portion 323B and the rear side face 202 of the base plate 120A.

If external stress to deform the side plate is applied by thermal expansion of the backlight unit 140, the stress concentrates on the portions that are fixed by screws. As described with reference to FIG. 3D, in the present embodiment, the side plate and the base plate are fixed by the female screw studs and male screws protruding rearward from the base plate, and the side plate and base plate are separated from each other at the fixed positions.

As described with reference to FIG. 3E, the side plate and the base plate are only just in contact or are separated from each other with a clearance in portions that are not fixed by screws. Thus, the base plate is not susceptible to directly receiving deforming stress, and it is possible to reduce the stress to the cover panel and the liquid crystal panel and release a decrease in image quality.

The above configuration example includes four individual brackets that fix together the backlight unit 140 and the cover panel 110. The four brackets surround the periphery of the backlight unit 140 and the cover panel 110. Each bracket includes a side plate and a base plate. An alternate configuration in which the base plates of the four brackets are continuous with each other and form a ring may be adopted.

Other Embodiments

Figure 4:
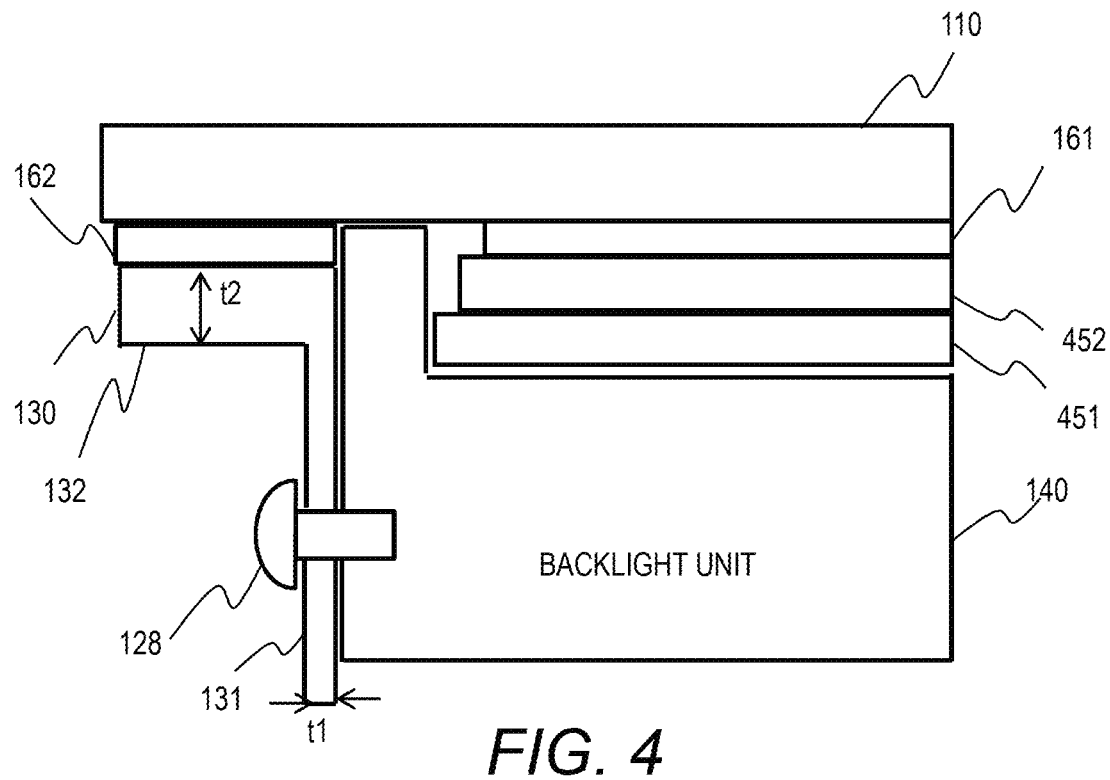
FIG. 4 depicts a configuration example of a liquid crystal display device according to another embodiment.

Below, configuration examples of a liquid crystal display device 10 of other embodiments will be explained. Differences from embodiments explained above will be primarily described. FIG. 4 depicts a configuration example of a liquid crystal display device 10 according to another embodiment. FIG. 4 depicts an edge face structure of a side end portion of the liquid crystal display device 10, similar to FIG. 1D or 1E. The cross-sectional structures of other side faces of the liquid crystal display device 10 are similar.

By contrast to the configuration described with reference to FIGS. 1A to 1E, the configuration depicted in FIG. 4 omits the base plate and screws that fix the base plate to the side plate. The front side face of the front end portion 132 of the side plate 130A and the rear side face of the cover panel 110 are bonded to each other by an adhesive layer 162. The front end portion 132 of the side plate 130A has a higher flexural rigidity than the side wall 131. In the example depicted in FIG. 4, a thickness t2 of the front end portion 132 is greater than a thickness t1 of the side wall 131. The thickness of the front end portion 132 and the thickness of the side wall 131 are uniform.

As described with reference to FIGS. 2A and 2C, by increasing the flexural rigidity of the front end portion 132 relative to the flexural rigidity of the side wall 131, it is possible to suppress deformation of the front end portion 132, thereby reducing stress on the cover panel 110 and the liquid crystal panel 145. The side plate 130A can be made by extrusion or the like of aluminum, magnesium, or the like, for example. According to this configuration, it is possible to reduce the number of parts in the liquid crystal display device 10.

Figure 5:
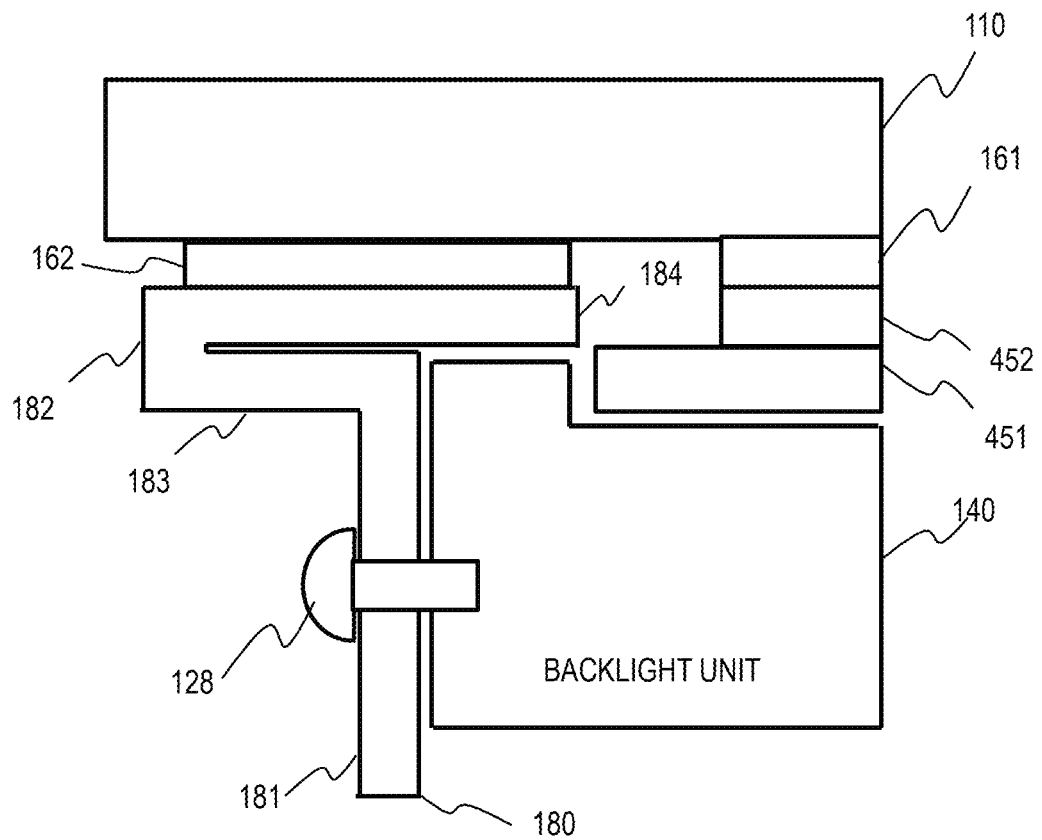
FIG. 5 depicts a configuration example of a liquid crystal display device according to another embodiment.

FIG. 5 depicts a configuration example of a liquid crystal display device 10 according to another embodiment. FIG. 5 depicts an edge face structure of a side end portion of the liquid crystal display device 10, similar to FIG. 1D or 1E. The cross-sectional structures of other side faces of the liquid crystal display device 10 are similar. By contrast to the configuration described with reference to FIGS. 1A to 1E, the configuration depicted in FIG. 5 omits the base plate and screws that fix the base plate to the side plate. Further, the side plate has a T shape in a cross-sectional view, and the front end portion is bent.

In the configuration example depicted in FIG. 5, the side plate 180 includes side wall 181 and a front end portion 182. The side wall 181 is similar to the side wall 131 described with reference to FIGS. 1A to 1E. The front end portion 182 is continuous with the side wall 181 and is bent. The front end portion 182 protrudes to the outside of the side wall 181, along the rear main surface 111 of the cover panel 110. The front end portion 182 additionally protrudes to the inside of the side wall 181, along the rear main surface 111 of the cover panel 110.

The front end portion 182 is continuous with the side wall 181, and includes a portion 183 that protrudes towards the outside (left side of FIG. 5), and a portion 184 that is continuous with the portion 183 and protrudes towards the inside (right side of FIG. 5). The portion 184 is to the front of the portion 183. The front surface of the portion 184 is bonded by the bonding layer 162 to the rear main surface 111 of the cover panel 110.

The configuration example depicted in FIG. 5 omits the base plate and screws that fix the base plate to the side plate. The front end portion 182 protrudes further inward than the side wall 181 (inner main surface thereof), and overlaps a portion of the backlight unit 140. It is possible to expand the bonding region between the front end portion 182 and the cover panel 110 towards the inner side of the backlight unit 140 (towards the liquid crystal panel 145), and reduce the size of the frame region of the liquid crystal display device 10.

Figure 6A:
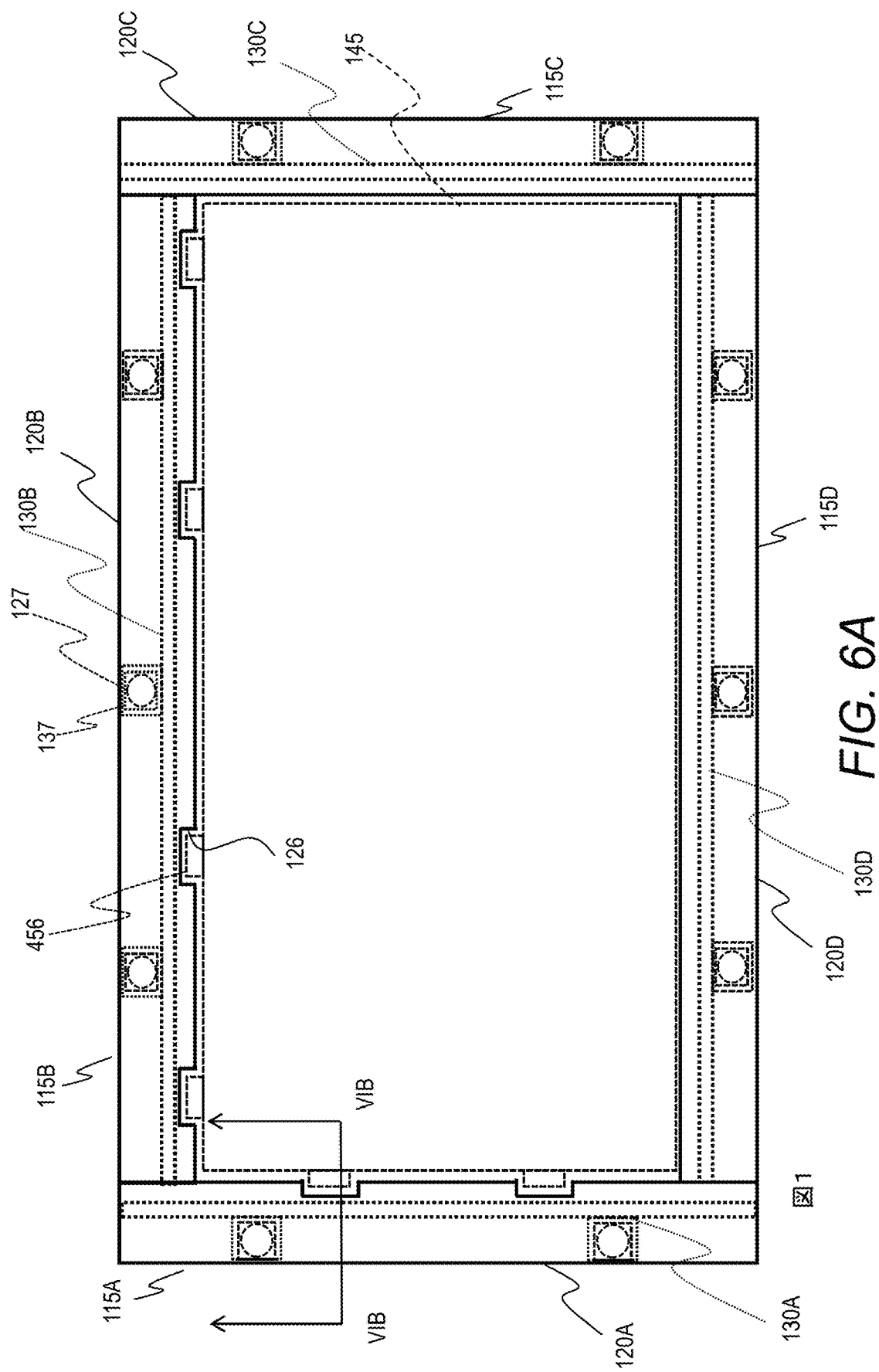
FIG. 6A is a plan view of the liquid crystal display device.
Figure 6B:
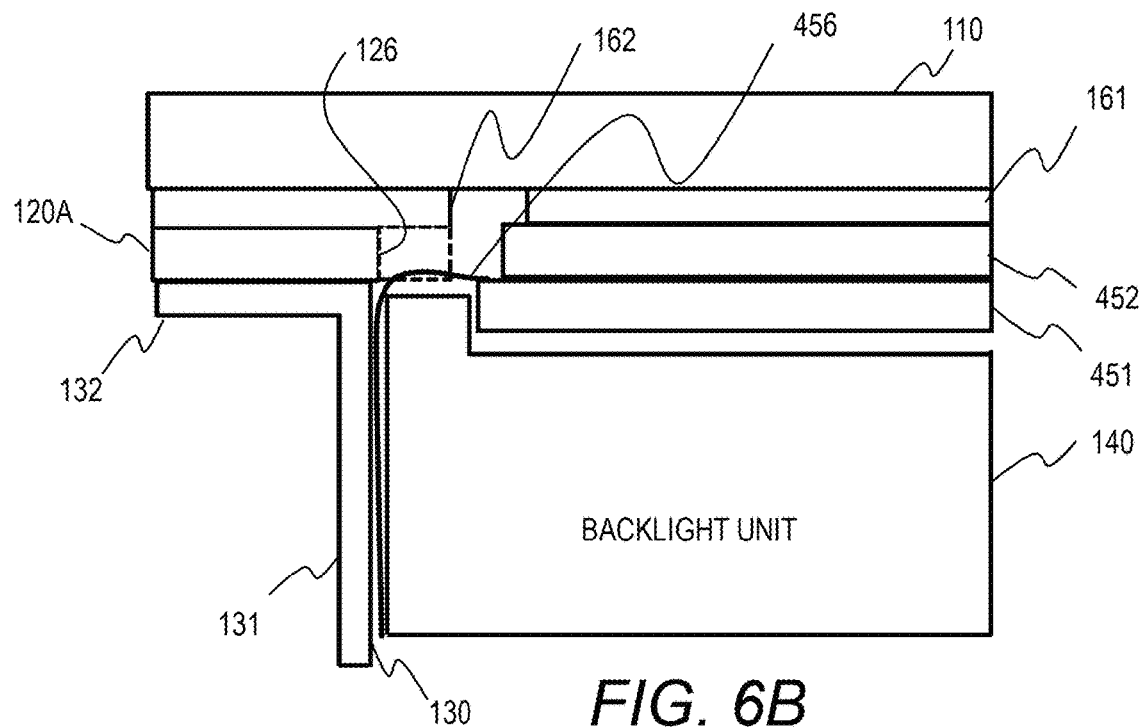
FIG. 6B depicts a cross-sectional structure along the line VIB-VIB of FIG. 6A.

FIGS. 6A and 6B depict a configuration example of a liquid crystal display device 10 according to another embodiment. FIG. 6A is a plan view of the liquid crystal display device 10. In FIG. 6A, the backlight unit 140 is omitted. FIG. 6B depicts a cross-sectional structure along the line VIB-VIB of FIG. 6A. The cross-sectional structures of other side faces of the liquid crystal display device 10 are similar. By contrast to the configuration described with reference to FIGS. 1A to 1E, a portion of each of the base plates 120A and 120B has a notch.

By passing a flexible cable 456 connected to the liquid crystal panel 145 through the notch, it is possible to avoid contact between the flexible cable 456 and the base plate, thereby reducing stress on the flexible cable 456. The flexible cable 456 is a chip-on-film (COF) polyimide film-type substrate, for example.

As depicted in FIG. 6A, the base plate 120A has two notches 126 that are separated from each other in the inner side face opposing the liquid crystal panel 145. The base plate 120B has four notches 126 in the inner side face opposing the liquid crystal panel 145. Only one notch is indicated with the reference character 126 and only one flexible cable is indicated with the reference character 456.

Each notch 126 opposes the connecting region between the flexible cable 456 and the liquid crystal panel 145. As a result of the notch 126, the space between the liquid crystal panel 145 and the base plate is larger than in portions where the notch 126 is not present. The width of the notch 126 (length in the direction along the side face of the liquid crystal panel 145) is greater than the width of the flexible cable 456.

As depicted in FIG. 6B, the flexible cable 456 extending from the TFT substrate 451 of the liquid crystal panel 145 passes through the notch 126 of the base plate 120A and the space between the backlight unit 140 and the side plate 130, and is connected to a control substrate (not depicted) that is fixed to the rear side face of the backlight unit 140.

The notch 126 is formed to prevent interference between the flexible cable 456 and the base plate, and the region not opposing the flexible cable 456 has no notch and is bonded to the cover panel 110. Thus, a bonding region necessary for bonding the base plate and the cover panel 110 is ensured.

Figure 7:
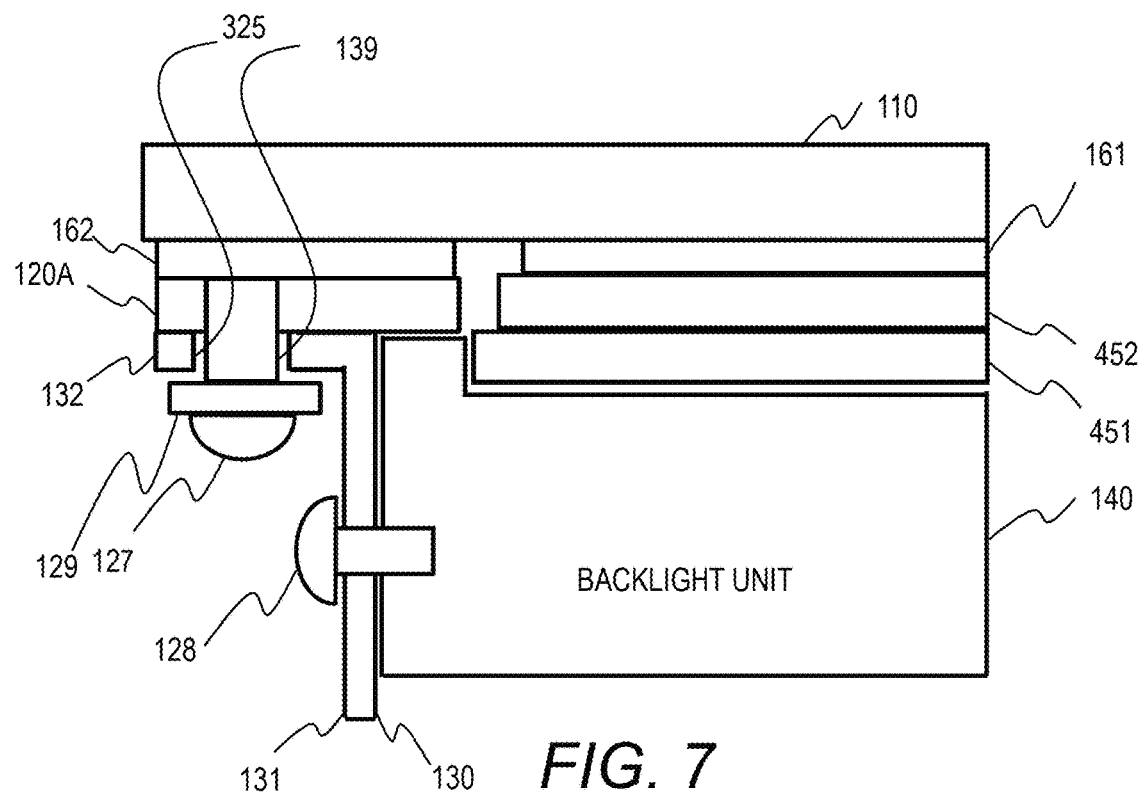
FIG. 7 depicts a configuration example of a liquid crystal display device according to another embodiment.

FIG. 7 depicts a configuration example of a liquid crystal display device 10 according to another embodiment. FIG. 7 depicts an edge face structure of a side end portion of the liquid crystal display device 10, similar to FIG. 1D or 1E. The cross-sectional structures of other side faces of the liquid crystal display device 10 are similar. By contrast to the configuration described with reference to FIGS. 1A to 1E, the configuration depicted in FIG. 7 differs in terms of how the base plate is attached to the side plate.

In the configuration depicted in FIG. 7, the base plate 120A is attached to the side plate 130A so as to be able to slide on the front side face of the front end portion 132 of the side plate 130A. As a result, it is possible to suppress deformation of the base plate 120A and the cover panel 110 resulting from deformation of the backlight unit 140.

As depicted in FIG. 7, a female screw stud 139 is pressed against the base plate 120A. The female screw stud 139 protrudes rearward from the rear side face of the base plate 120A. The front end portion 132 of the side plate 130A has a hole 325 larger than the outer diameter of the female screw stud 139. Enough clearance to prevent detachment is present between the inner circumference of the hole 325 and the female screw stud 139.

The female screw stud 139 penetrates the hole 325 of the front end portion 132 of the side plate 130A. A male screw 127 engages with the female screw stud 139 from the rear of the front end portion 132. A washer 129 is sandwiched between the front side face of the head of the male screw 127 and the rear side face of the female screw stud 139. The male screw 127 and the female screw stud 139 engage each other with the washer 129 therebetween. If the outer diameter of the head of the male screw 127 is greater than the diameter of the hole 325 of the front end portion 132, then the washer 129 may be omitted.

The height of the female screw stud 139 (length in front-rear direction) is greater than thickness of the front end portion 132 of the side plate 130A. The female screw stud 139 protrudes rearward from the hole 325. The rear side face of the female screw stud 139 is to the rear of the rear side face of the front end portion 132. The outer diameter of the washer 129 is greater than the diameter of the hole 325. Enough clearance to prevent detachment is present between the front side face of the head of the male screw 127, the washer 129, and the rear side face of the front end portion 132.

The side plate 130A is not completely fixed to the base plate 120A, and the side plate 130A can slide in a direction parallel to the main surface of the cover panel 110 due to deformation of the backlight unit 140. The flexural rigidity of the beam portion including the base plate 120A and the front end portion 132 may be less than or equal to the flexural rigidity of the side wall 131.

If external stress causing deformation of the side plate 130A occurs as a result of thermal expansion of the backlight unit 140, the side plate 130A slides against the base plate 120A due to deformation of the backlight unit 140. Thus, the base plate 120A does not deform. As a result, no stress is applied to the cover panel 110 and the liquid crystal panel 145, thereby mitigating a decrease in image quality.

Figure 8A:
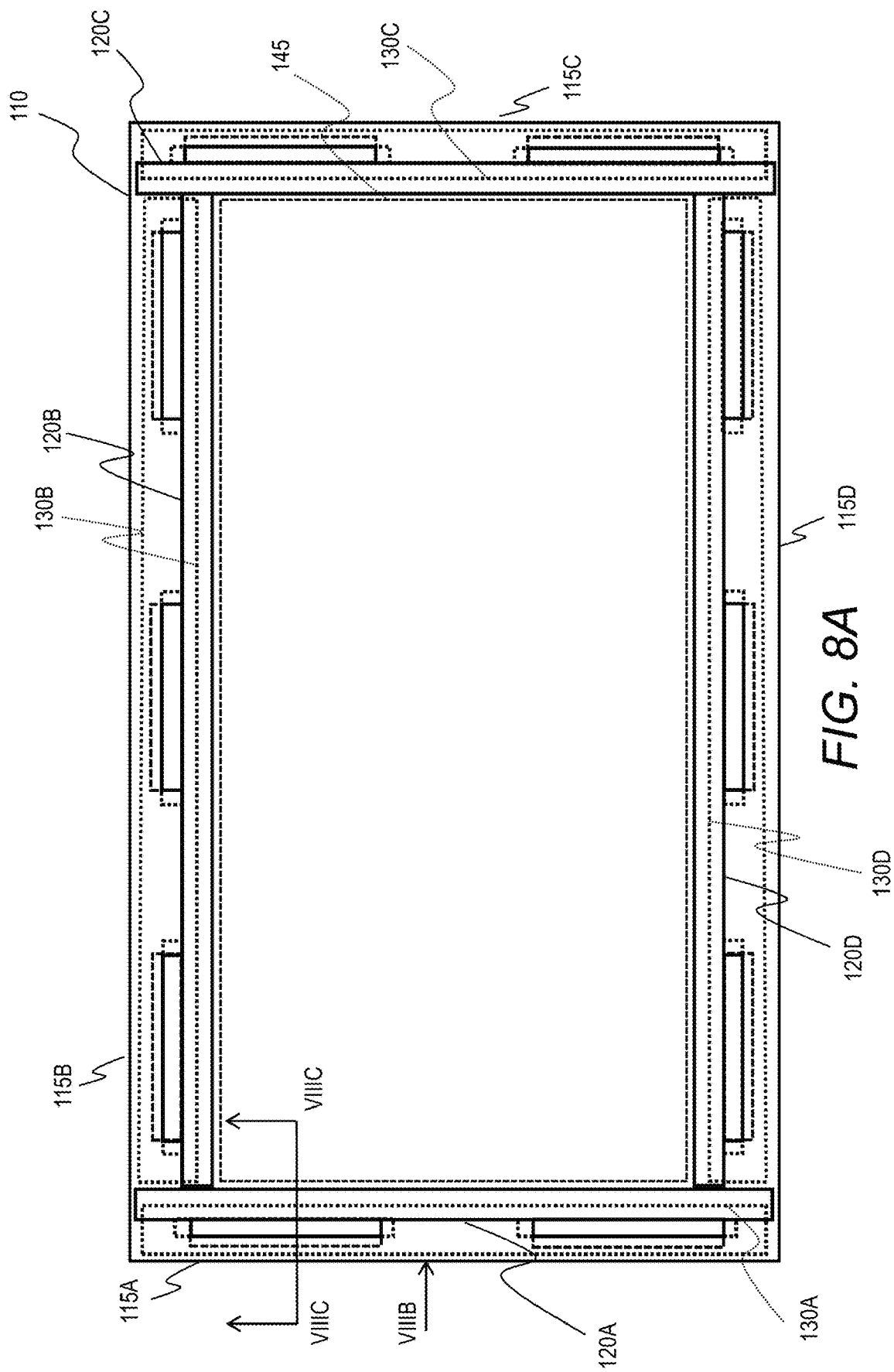
FIG. 8A is a plan view of the liquid crystal display device.
Figure 8B:
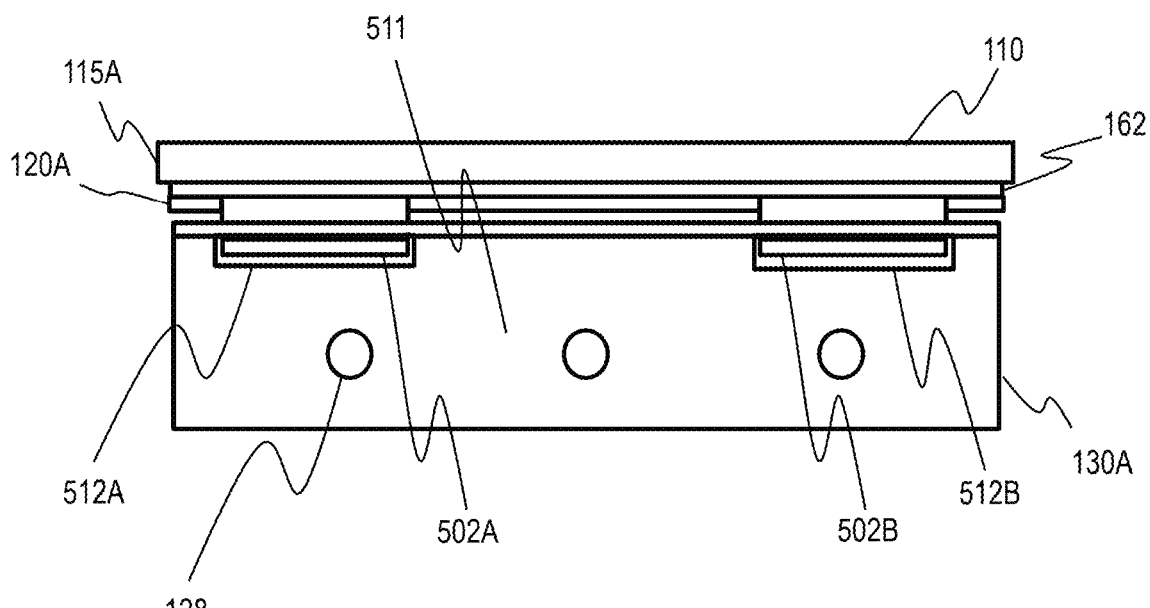
FIG. 8B depicts a side face of the liquid crystal display device indicated by the arrow VIIIB in FIG. 8A.
Figure 8C:
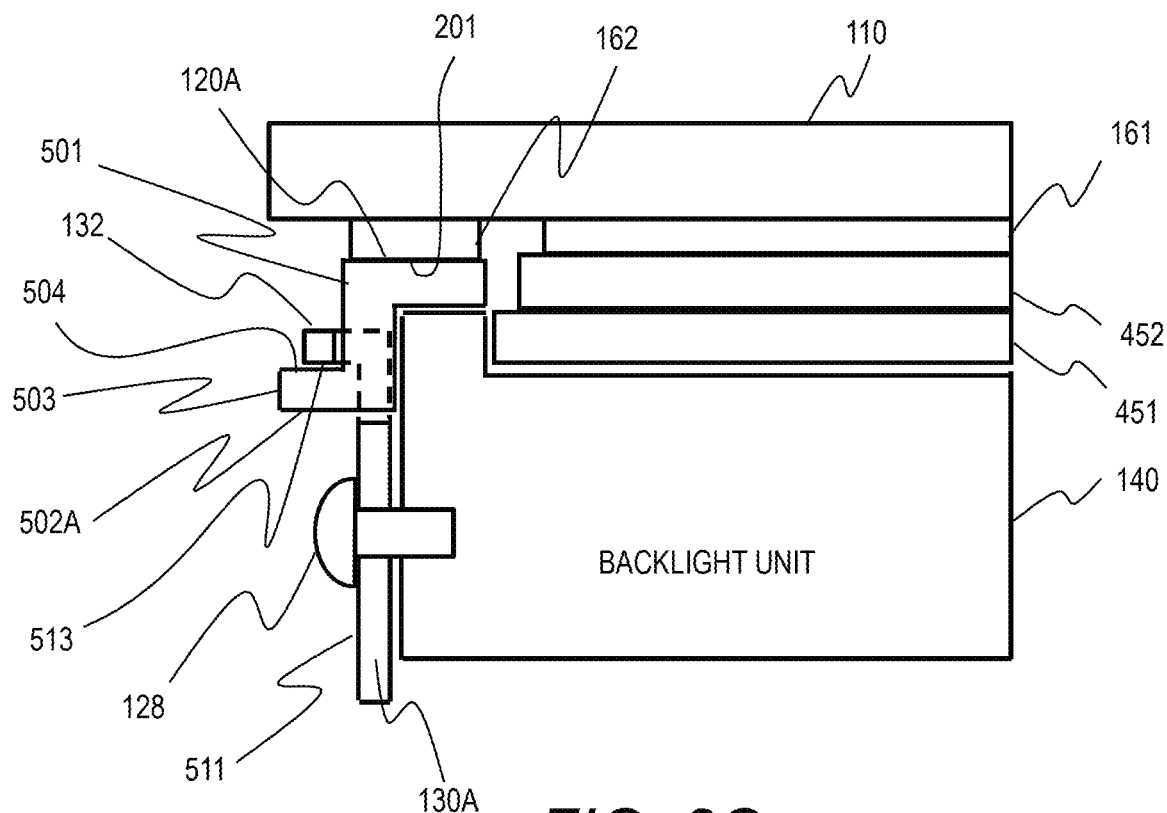
FIG. 8C depicts the cross-sectional structure along the line VIIIC-VIIIC in FIG. 8A.

FIGS. 8A to 8C depict a configuration example of a liquid crystal display device 10 according to another embodiment. By contrast to the configuration example described with reference to FIGS. 1A to 1E, the structure by which the side plate is attached to the base plate differs, and screws that fix the base plate to the side plate are omitted. FIG. 8A is a plan view of the liquid crystal display device 10. In FIG. 8A, the backlight unit 140 is omitted. FIG. 8B depicts a side face of the liquid crystal display device 10 indicated by the arrow VIIIB in FIG. 8A. The structures of other side faces of the liquid crystal display device 10 are similar to the structure of FIG. 8B.

FIG. 8C depicts the cross-sectional structure along the line VIIIC-VIIIC in FIG. 8A. Specifically, FIG. 8C depicts the cross-sectional structure of the portion where the side plate 130A and the base plate 120A are fixed to each other. The cross-sectional structures of other side faces of the liquid crystal display device 10 are similar to the structure of FIG. 8C.

In the side face depicted in FIG. 8B, the base plate 120A has a plurality of separated beam portions 502A and 502B. A side wall 511 of the side plate 130A has holes 512A and 512B that are larger than the outer shape of the beam portions 502A and 502B of the base plate.

In the cross-sectional structure depicted in FIG. 8C, the base plate 120A has the side wall 501, which rises vertically from the front side face 201, and the beam portion 502A that protrudes towards the outside (left side in FIG. 8C), the side wall and the beam portion being formed by bending the base plate 120A. The front end portion 503 of the beam portion protrudes further than the side wall 511 of the side plate 130A.

The front side face 504 of the beam portion 502A of the base plate 120A is in contact with the rear side face 513 of the front end portion 132 of the side plate 130A or there is a clearance therebetween. The side plate 130A is attached to the base plate 120A so as to be able to slide on the rear side face of the beam portion 502A of the base plate 120A. The side plate 130A follows the position of the base plate 120A during assembly, and thus, no deformation occurs in the base plate 120A. The flexural rigidity of the base plate 120A may be less than or equal to the flexural rigidity of the side plate 130A.

If external stress causing deformation of the side plate 130A occurs as a result of thermal expansion of the backlight unit 140, the side plate 130A slides against the base plate 120A due to deformation of the backlight unit 140. Thus, the base plate 120A does not deform. As a result, there is no stress on the cover panel 110 and the liquid crystal panel 145, thereby mitigating a decrease in image quality.

As set forth above, embodiments of the present disclosure have been described; however, the present disclosure is not limited to the foregoing embodiments. Those skilled in the art can easily modify, add, or convert each element in the foregoing embodiment within the scope of the present disclosure. A part of the configuration of one embodiment may be replaced with a configuration of another embodiment or a configuration of an embodiment may be incorporated into a configuration of another embodiment.

What is claimed is:
1. A liquid crystal display device, comprising:
a backlight unit;
a liquid crystal panel disposed in front of the backlight unit;
a transparent front surface panel that is disposed in front of the liquid crystal panel, and that includes a rear main surface bonded to a front main surface of the liquid crystal panel by a transparent adhesive resin layer; and a bracket that is fixed to a side face of the backlight unit and bonded to the rear main surface of the front surface panel by an adhesive portion, wherein the bracket includes:
- an L-shaped component having an L-shaped cross-section; and
- a base plate, wherein the L-shaped component includes:
- a side wall that is fixed to the side face of the backlight unit, rises from rear to front along the side face, and extends along a side face of the front surface panel; and
- a front end portion that is continuous with the side wall, that protrudes to outside the side wall along the rear main surface of the front surface panel, and that extends along the side face of the front surface panel, wherein the liquid crystal panel is supported by the transparent front surface panel in suspension with the transparent adhesive resin layer, wherein the base plate is present in front of the front end portion, protrudes to outside the side wall along the rear main surface of the front surface panel, and extends along the side face of the front surface panel, wherein the adhesive portion is bonded to a front side face of the base plate, wherein the liquid crystal panel is separated by a first gap from the bracket and an entire rear surface of the liquid crystal panel is separated by a second gap from a front main surface of the backlight unit, wherein the L-shaped component has holes, wherein the bracket includes penetrating portions with outer shape smaller than the holes, penetrating portions penetrating the holes from the base plate, respectively, and wherein the bracket includes opposing portions on ends of the penetrating portions, at least a part of the opposing portions opposing the front end portion of the L-shaped component.

2. The liquid crystal display device according to claim 1,
wherein the base plate is fixed to the front end portion of the L-shaped component in regions arranged apart from each other along the side face of the front surface panel.

3. The liquid crystal display device according to claim 2,
wherein the bracket further includes female screw studs that protrude rearward from a rear side face of the base plate, wherein the front end portion of the base plate includes:
a plurality of front side portions; and
a rear side portion that is present between the plurality of front side portions in a direction along the side face of the front surface panel, and that is located to a rear of the front side portion, and wherein the base plate is fixed to the front end portion by female screw studs and male screws that penetrate holes in the rear side portion.

* * * * *